US012292829B2

(12) United States Patent
Meng et al.

(10) Patent No.: US 12,292,829 B2
(45) Date of Patent: May 6, 2025

(54) METHOD AND DEVICE FOR ALLOCATING STORAGE ADDRESSES FOR DATA IN MEMORY

(71) Applicant: Cambricon (Xi'an) Semiconductor Co., Ltd., Xi'an (CN)

(72) Inventors: Xiaofu Meng, Xi'an (CN); Tian Zhi, Xi'an (CN); Zhenxing Zhang, Xi'an (CN); Xunyu Chen, Xi'an (CN)

(73) Assignee: CAMBRICON (XI'AN) SEMICONDUCTOR CO., LTD., Xi'an (CN)

( * ) Notice: Subject to any disclaimer, the term of this patent is extended or adjusted under 35 U.S.C. 154(b) by 0 days.

(21) Appl. No.: 17/998,892

(22) PCT Filed: May 12, 2021

(86) PCT No.: PCT/CN2021/093466
§ 371 (c)(1),
(2) Date: Nov. 15, 2022

(87) PCT Pub. No.: WO2021/233187
PCT Pub. Date: Nov. 25, 2021

(65) Prior Publication Data
US 2023/0214322 A1 Jul. 6, 2023

(30) Foreign Application Priority Data

May 18, 2020 (CN) .......................... 202010421439.7
May 18, 2020 (CN) .......................... 202010421447.1

(51) Int. Cl.
*G06F 12/06* (2006.01)
*G06N 3/0464* (2023.01)
(52) U.S. Cl.
CPC .......... *G06F 12/06* (2013.01); *G06N 3/0464* (2023.01)

(58) Field of Classification Search
None
See application file for complete search history.

(56) References Cited

U.S. PATENT DOCUMENTS

| 5,659,704 | A | 8/1997 | Burkes et al. |
| 5,864,867 | A | 1/1999 | Krusche et al. |

(Continued)

FOREIGN PATENT DOCUMENTS

| CN | 1143220 A | 2/1997 |
| CN | 1085863 C | 5/2002 |

(Continued)

OTHER PUBLICATIONS

PCT/CN2021/093466—International Search Report and Written Opinion, mailed Oct. 10, 2020, 16 pages.

(Continued)

*Primary Examiner* — Prasith Thammavong
*Assistant Examiner* — Edmund H Kwong
(74) *Attorney, Agent, or Firm* — Getech Law LLC; Jun Ye

(57) ABSTRACT

The present disclosure relates to a method, a device and a computation apparatus for allocating a space address to data in a memory, where the computation apparatus is included in a combined processing apparatus, which includes a general interconnection interface and other processing apparatuses. The computation apparatus interacts with other processing apparatuses to jointly complete computations specified by the user. The combined processing apparatus also includes a storage apparatus. The storage apparatus is respectively connected to the computation apparatus and the other processing apparatuses, and is used for storing data of the computation apparatus and other processing apparatuses. The technical solutions of the present disclosure improve utilization of storage space of the memory.

17 Claims, 36 Drawing Sheets

(56) References Cited

U.S. PATENT DOCUMENTS

| | | | |
|---|---|---|---|
| 7,234,039 B1 | 6/2007 | Righi et al. | |
| 2011/0153976 A1 | 6/2011 | Tamura et al. | |
| 2012/0303927 A1* | 11/2012 | Goldberg | G06F 12/02 711/171 |
| 2013/0227236 A1* | 8/2013 | Flynn | G06F 12/0292 711/172 |
| 2018/0088996 A1 | 3/2018 | Rossi et al. | |
| 2021/0208987 A1* | 7/2021 | Hao | G06F 3/0647 |

FOREIGN PATENT DOCUMENTS

| | | |
|---|---|---|
| CN | 102012870 A | 4/2011 |
| CN | 102981966 A | 3/2013 |
| CN | 102981966 B | 4/2016 |
| CN | 106462491 A | 2/2017 |
| CN | 107133182 A | 9/2017 |
| CN | 108874532 A | 11/2018 |
| CN | 109783220 A | 5/2019 |
| CN | 110704214 A | 1/2020 |
| CN | 106462491 B | 8/2020 |
| CN | 109783220 B | 12/2020 |
| DE | 59410112 | 6/2002 |
| EP | 0703534 A1 | 3/1996 |
| EP | 0703534 B1 | 5/2002 |
| ES | 2176214 T3 | 12/2002 |
| WO | 2016106757 A1 | 7/2016 |
| WO | 2016191964 A1 | 12/2016 |
| WO | WO-2017107015 A1 * | 6/2017 ............... G06F 3/06 |

OTHER PUBLICATIONS

EP21808996.9—Extended European Search Report mailed on Dec. 12, 2023, 10 pages.
CN202010421439.7—First Office Action mailed on Sep. 30, 2024, 12 pages.
CN202010421447.1—First Office Action mailed on Oct. 17, 2024, 14 pages.
CN202010421439.7—Second Office Action mailed on Feb. 25, 2025, 12 pages.
CN202010421447.1—Second Ofice Action mailed on Mar. 6, 2025, 13 pages.

* cited by examiner

| RegClass 32 | $R_{32,0}$ | | $R_{32,1}$ | | |
|---|---|---|---|---|---|
| RegClass 24 | $R_{24,0}$ | | $R_{24,1}$ | | $R_{24,2}$ |
| RegClass 16 | $R_{16,0}$ | $R_{16,1}$ | $R_{16,2}$ | $R_{16,3}$ | |
| RegClass 8 | $R_{8,0}$ | | | $R_{8,4}$ | | $R_{8,8}$ |

Fig. 1c

```
alloc D1 400
alloc D2 100
alloc D3 400
dealloc D3
alloc D4 300
dealloc D2
alloc D5 300
dealloc D1
dealloc D4
dealloc D5
```

Fig. 2b

METHOD AND DEVICE FOR ALLOCATING STORAGE ADDRESSES FOR DATA IN MEMORY

CROSS REFERENCE OF RELATED APPLICATION

This is a 371 of International Application No. PCT/CN2021/093466, filed May 12, 2021, which claims priority to Chinese Patent Application No. 202010421439.7 with the title of "Method and Device for Allocating Space Addresses for Data in Memory" filed on May 18, 2020, and No. 202010421447.1 with the title of "Method and Device for Allocating Space Addresses for Data in Memory" filed on May 18, 2020, the contents of which are incorporated herein by reference in its entirety.

TECHNICAL FIELD

The present disclosure relates to a computer field, specifically to management of storage space.

BACKGROUND

Deep neural network (DNN) is widely applied to various scenarios, such as computer vision, speech recognition, machine translation and robot technology. An accuracy of the DNN is greatly improved compared with a traditional method of machine learning. However, a performance advantage of the DNN is at a cost of relatively high complexity of computation and memory, which is a challenge to an underlying hardware architecture. In order to improve processing efficiency of the DNN, all kinds of dedicated accelerators are proposed to provide better performance and efficiency than a general architecture (such as a CPU (central processing unit) and a GPU (graphics processing unit)).

A dedicated neural network accelerator generally requires various novel architecture components, including a control logic (for example, DianNao adopts a control processor with a dedicated control instruction, and Eyeriss adopts a two-level control hierarchy), a computation unit (for example, DianNao adopts 16 fixed functional units to utilize a fault-tolerance character of an intelligence application), an application and a memory hierarchy (for example, DianNao advices to use a separate on-chip memory for both a neuron and weight).

An SPM (scratchpad memory) in the prior art is vital for flexibly control of costly data movement. There are three reasons for using the SPM in a neural network accelerator. 1) In terms of performance, power, and area, hardware overhead of the SPM is relatively low compared with a cache of hardware management; 2) flexibility of programming of the SPM may provide more opportunities for mining performance and power; 3) extra programing work may not bring more burden to programmers, since compared with a general-purpose application with a complicated control flow, execution mode of a neural network application is relatively regular.

However, management of the SPM is not only aimed at neural network acceleration. A key idea of the prior art is to express the management of the SPM to an allocation problem of a register; and all kinds of technologies such as memory coloring, graph coloring, ILP (integer linear programming) and ILP extension are used for register allocation.

Such techniques are well suited for register allocation, but inefficient for SPM management of NN (Neural Network) accelerator. The main reason is that a length of the register (including a scalar register and a vector register) is fixed, yet memory requirement of the SPM in the NN accelerator has a variable length to realize high efficiency. Therefore, if the prior art is applied to the SPM management of the NN accelerator, differentiated functions of registers and SPM may lead to low efficiency.

It may be seen that space utilization is relatively low in the prior art, which may lead to storage space fragmentation.

Besides, for a better use of storage space, many schemes of managing space of the memory are provided, such as best fit (BF) and graph coloring (GC), and the like.

However, in the prior art, storage space is assigned in the form of immediate numbers; and there is no suitable space allocation scheme for data with variable value. Besides, in the prior art, utilization of the space is insufficient.

SUMMARY

One of the purpose of the present disclosure is to solve problems of low space utilization and storage space fragmentation in the prior art.

A first aspect of the present disclosure provides a method for allocating a space address to data in a memory, including: receiving a space assigning request for storage space in the memory, where the space assigning request comprises a size of the data; assigning target storage space to the data according to the received space assigning request; and allocating the space address to the data based on the assigned target storage space.

A second aspect of the present disclosure provides a method for managing storage space, including: forming a plurality of memory blocks, where each memory block has a total storage size identifier and an available storage size identifier, where the total storage size identifier is used to indicate total storage size of the memory block, and the available storage size identifier is used to indicate available storage size of the memory block; and taking the plurality of memory blocks as nodes to form a tree structure, which comprises a plurality of nodes of multi-stage, where total storage size of a parent node is a sum of total storage size of children nodes.

A third aspect of the present disclosure provides a method for assigning storage space to data in a memory, including: receiving a space assigning request aiming at storage space in the memory, where the space assigning request comprises a size of the data; and forming a plurality of memory blocks, where each memory block has a total storage size identifier and an available storage size identifier, where the total storage size identifier is configured to indicate total storage size of the memory block, and the available storage size identifier is configured to indicate available storage size of the memory block.

A forth aspect of the present disclosure provides an electronic device, including: one or more processors; and a memory, where the memory stores a computer executable instruction, and when the computer executable instruction is executed by the one or more processors, the electronic device may perform the above mentioned method.

A fifth aspect of the present disclosure provides a computer-readable storage medium, on which a computer executable instruction is stored. The above mentioned method may be implemented when the computer executable instruction is executed by one or more processors.

One of technical effects implemented by the technical solutions of the present disclosure is greatly improving utilization of storage space of the memory, thereby decreasing power consumption of the memory.

Another purpose of the present disclosure is to allocate suitable storage space to data with an unknown size and represented by a function.

A sixth aspect of the present disclosure provides a method for allocating a space address to data in a memory, including: receiving a space assigning request aiming at storage space in the memory, and the space assigning request comprises a size of the data represented by a first function; assigning target storage space for the data according to the received space assigning request; and allocating the space address to the data based on the assigned target storage space.

A seventh aspect of the present disclosure provides a method for managing storage space, including: forming a plurality of memory blocks, where each memory block has a total storage size identifier and an available storage size identifier, where the total storage size identifier is configured to use a total space function to indicate total storage size of the memory block, and the available storage size identifier is configured to use a second function to indicate available storage size of the memory block; and taking the plurality of memory blocks as nodes to form a tree structure, which comprises a plurality of nodes of multi-stage, where total storage size of a parent node is a sum of total storage size of children nodes.

An eighth aspect of the present disclosure provides a method for assigning storage space to data in a memory, including: receiving a space assigning request aiming at the storage space in the memory, where the assigning request comprises a size of the data represented by a first function; forming a plurality of memory blocks, where each memory block has a total storage size identifier and an available storage size identifier, where the total storage size identifier is configured to use a total space function to indicate total storage size of the memory block, and the available storage size identifier is configured to use a second function to indicate available storage size of the memory block; taking the plurality of memory blocks as nodes to form a tree structure, which comprises a plurality of nodes of multi-stage, where total storage size of a parent node is a sum of total storage size of children nodes; and assigning target storage space to the data according to the received space assigning request and the tree structure.

A ninth aspect of the present disclosure provides an electronic device, including: one or more processors; and a memory, where the memory stores a computer executable instruction, and when the computer executable instruction is operated by the one or more processors, the electronic device may perform the above mentioned method.

A tenth aspect of the present disclosure provides a computer-readable storage medium, on which a computer executable instruction is stored, where the above mentioned method is implemented when the computer executable instruction is executed by one or more processors.

BRIEF DESCRIPTION OF DRAWINGS

By reading the following detailed description with reference to the drawings, other objects, features and technical effects of the exemplary embodiments of the present disclosure may become easier to understand. In the drawings, several embodiments of the present disclosure are shown in an exemplary but not in a restrictive manner, and the same or corresponding reference numerals indicate the same or corresponding parts of the embodiments.

FIG. 1B is an example of assigning storage space according to a computation process of FIG. 1a.

FIG. 1c is an example of assigning the storage space according to the computation process of FIG. 1a.

FIG. 2b is an exemplary instruction set of assigning the storage space to the data and releasing the storage space according to an embodiment of the present disclosure.

FIG. 6b is a schematic diagram of the new nodes created according to the flowchart of the method shown in FIG. 6a.

FIG. 6c is a schematic diagram of the new nodes created according to the flowchart of the method shown in FIG. 6a.

FIG. 15b is a schematic diagram of the new nodes created according to the flowchart of the method shown in FIG. 15a.

FIG. 15c is a schematic diagram of the new nodes created according to the flowchart of the method shown in FIG. 15a.

DETAILED DESCRIPTION

Technical solutions in embodiments of the present disclosure will be described clearly and completely hereinafter with reference to the drawings in the embodiments of the present disclosure. Obviously, the to-be-described embodiments are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "the first", "the second", "the third", and "the fourth" appear in the claims, the specification, and the drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claim of the present disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

As being used in this specification and the claim, the term "if" may be interpreted as "when", or "once" or "in response to a determination" or "in response to a case where something is detected" depending on the context. Similarly, depending on the context, the clause "if it is determined that" or "if [a described condition or event] is detected" may be interpreted as "once it is determined that", or "in response to a determination", or "once [a described condition or event] is detected", or "in response to a case where [a described condition or event] is detected".

Figure 1A:
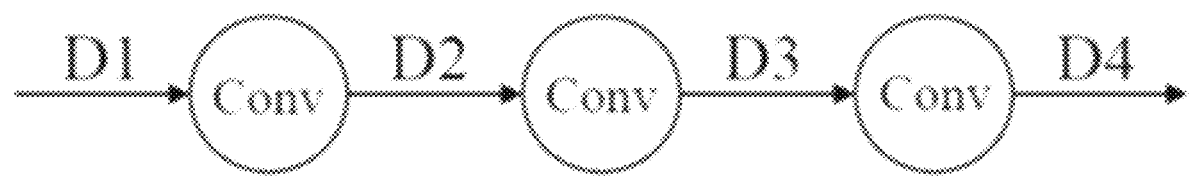
FIG. 1a is a schematic diagram of a general neural network computation.

FIG. 1a to FIG. 1d are schematic diagrams of different methods of assigning storage space, where FIG. 1a shows a schematic diagram of a general neural network computation.

As shown in FIG. 1a, a convolution neural network includes data D1 to D4, and a signal Cony represents a convolution computation. Therefore, D2=Conv(D1), D3=Conv(D2), and D4=Conv(D3). For example, D1 is 16 bits, D2 is 8 bits, D3 is 24 bits, and D4 is 32 bits. During the continuous convolution computation, storage space is required to be assigned for data involved in the computation, and space occupied by historical data is required to be released.

Figure 1B:
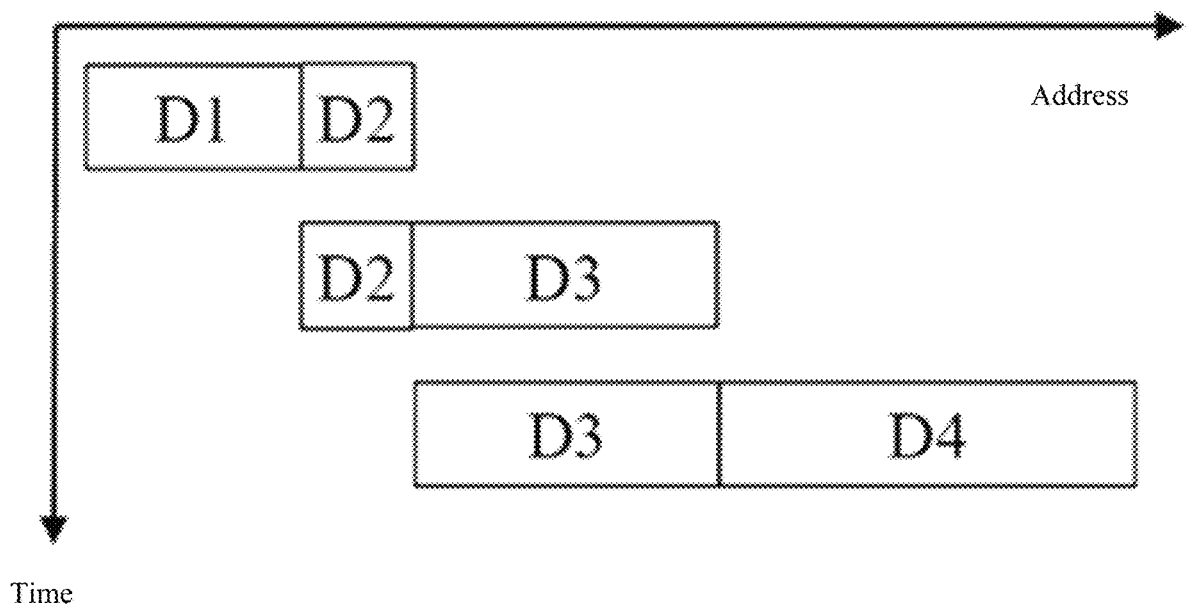

FIG. 1B is a kind of example of assigning the storage space according to a computation process in FIG. 1a, and this example is called as a best fit (BF).

In FIG. 1B, addresses are first assigned to data D1 and D2; when a second convolution computation is performed, space occupied by the data D1 may be released, and storage space is assigned to data D3; similarly, when a third convolution computation is performed, space occupied by the data D2 may be released, and storage space is assigned to data D4. In a scheme shown in FIG. 1B, lots of space debris may be generated, thereby decreasing utilization of the storage space.

FIG. 1c is another example of assigning the storage space according to the computation process of FIG. 1a, and this example is called as graph coloring (GC).

As shown in FIG. 1c, the storage space is divided into a plurality of types: Regclass32 represents space with a capacity of 32 bits, Regclass24 represents space with a capacity of 24 bits, Regclass16 represents space with a capacity of 16 bits, and Regclass8 represents space with a capacity of 8 bits. Under this case, the data D1 to D4 may be divided into different types according to different sizes. For example, the data D1 is stored in a space R16, 0 in the Regclass16, the data D2 is stored in a space R8, 4 in the Regclass8, the data D3 is stored in a space R24, 0 in the Regclass24, and data D4 is stored in a space R32, 1 in the Regclass32. With this allocation, lots of space debris may still be generated, especially when a size of a piece of data is smaller than a type of data and larger than another type of data, fragmentation of the storage space may become more obvious. For example, if a size of a piece of data is 20 bits, the piece of data should be stored in the Regclass24, which may waste 4-bit space.

Figure 1D:
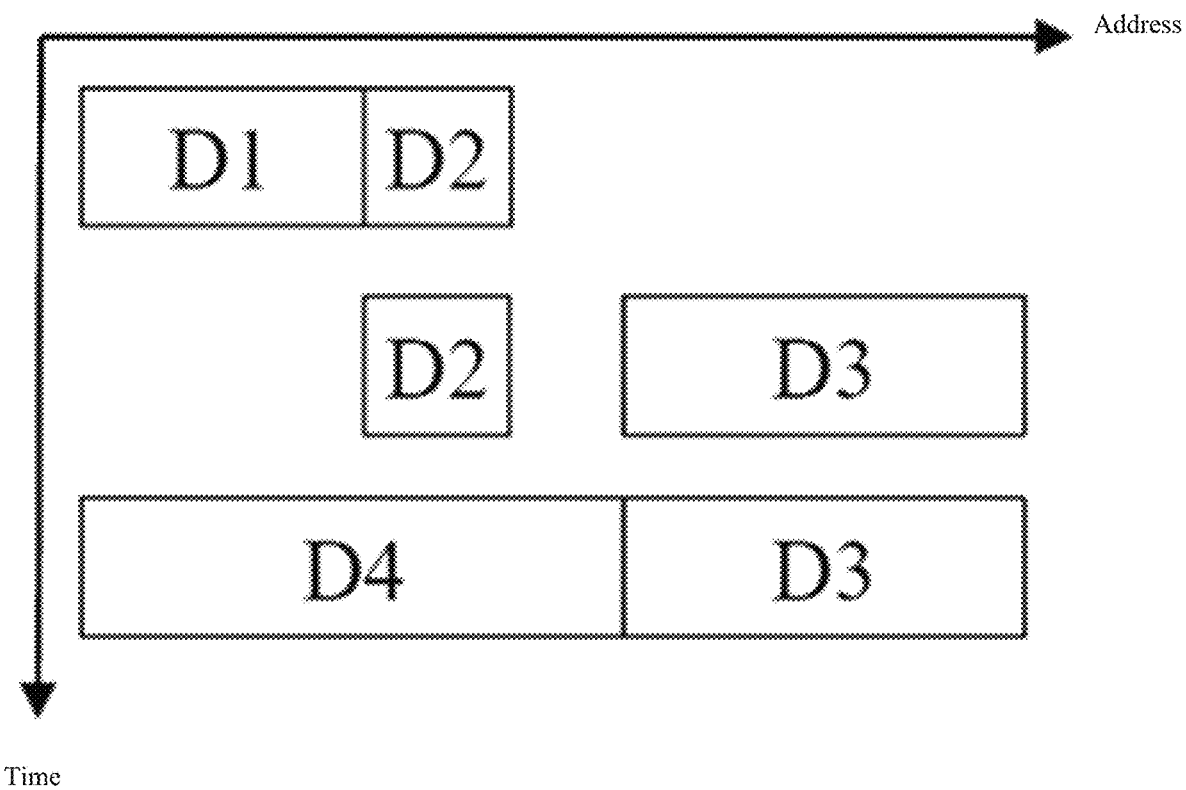
FIG. 1d is an ideal method of assigning the storage space.

FIG. 1d is an ideal method for assigning the storage space, and this ideal assigning method is a limit of space assigning.

As shown in FIG. 1d, the storage space is assigned to the data D1 and data D2 first, and the two storage space is adjacent, just like other methods. Next, the space occupied by the data D1 is released, and the data D3 is required to be stored. Under an ideal condition, the storage space of the data D3 should be as shown in FIG. 1d, reserving corresponding space for the data D4; when the data D4 is required to be stored, the space reserved for the data D4 is adjacent with the space of data D3, which may reduce the occurrence of fragmentation and reduce hopping of data addressing. However, the ideal condition is hard to be implemented, because it requires prediction to a size of future data.

Further, an SPM management is seen as a traditional memory allocation. In such a scheme, space and an address are determined simultaneously and assigned to data, which leads to limitations of the prior art in space utilization.

Figure 2A:
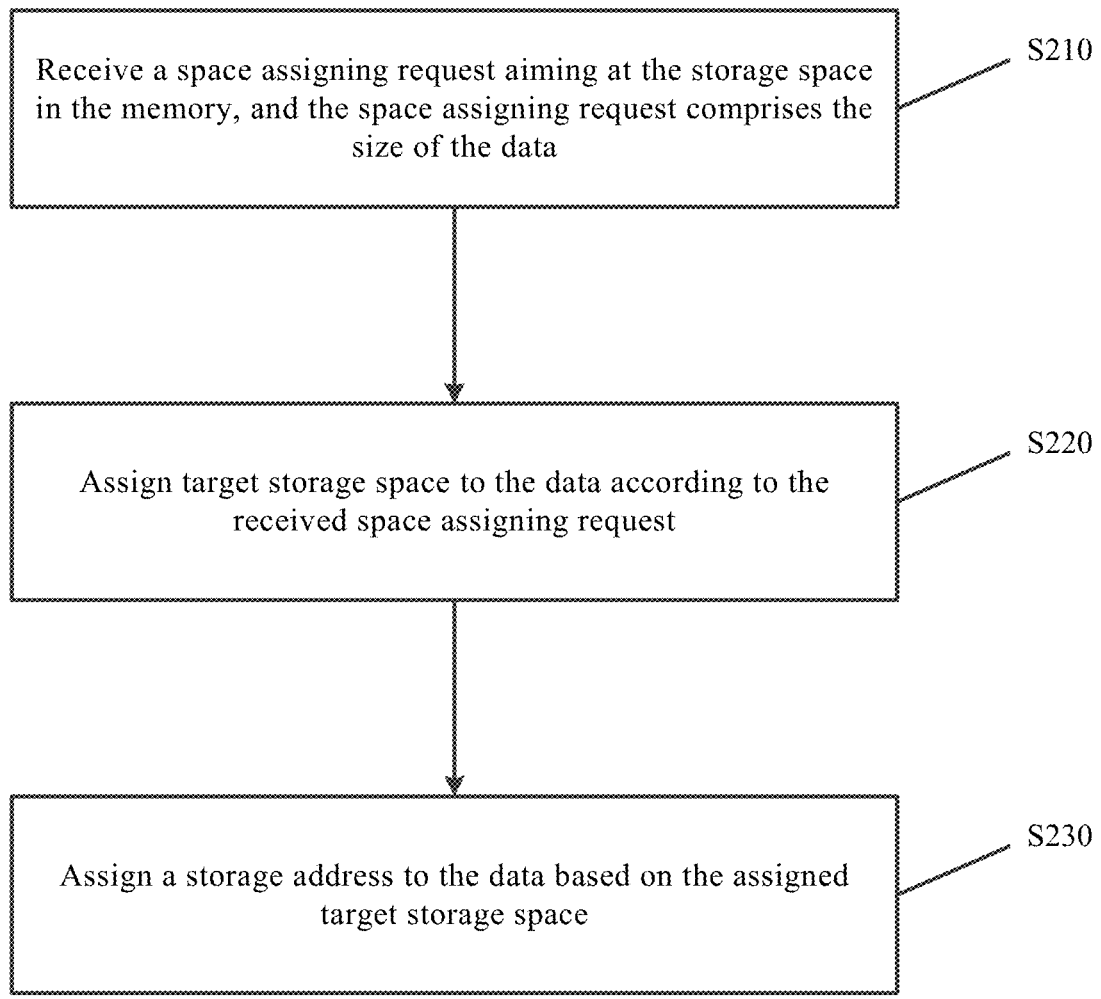
FIG. 2a is a flowchart of a method of allocating a space address to data in a memory according to an embodiment of the present disclosure.

FIG. 2a is a flowchart of a method of allocating a space address to data in a memory according to an embodiment of the present disclosure. FIG. 2b is an exemplary instruction set of assigning the storage space to the data and releasing the storage space according to an embodiment of the present disclosure.

As shown in FIG. 2a, the methods of the present disclosure include: at step S210, receiving a space assigning request aiming at the storage space in the memory, and the space assigning request comprises the size of the data; at step S220, assigning target storage space to the data according to the received space assigning request; and at step S230, allocating a space address to the data based on the assigned target storage space.

It should be understood that in the above mentioned context, except for the size of the data, the space assigning request may carry other information, such as life circle of resources, including application time, releasing time of resources represented by the life circle, and orders of the application and the releasing. Different orders may lead to different results.

As shown in FIG. 2b, a plurality of instructions are shown according to a chronological order, where an instruction "alloc" represents assigning the storage space, and an instruction "dealloc" represents releasing the storage space. For example, operations "alloc D1 400", "alloc D2 100" and "alloc D3 400" respectively represent assigning storage space with a capacity of 400 bits to the data D1, assigning storage space with a capacity of 100 bits to the data D2, and assigning storage space with a capacity of 400 bits to the data D3. Similarly, operations "dealloc D3", "delaaoc D1", "dealloc D4" and "dealloc" D5 respectively represent releasing space occupied by D3, D1, D4 and D5, and then the released space may become available storage size. The available storage size may be assigned to other data again.

Next, after the space assigning request is received, a suitable part of storage space chosen from the available storage size or all the storage space may be taken as target storage space to be assigned to the above mentioned data. It needs to be explained that the above mentioned term "target storage space" refers to actual space assigned to the data. For example, current available storage size is 400 bits, yet a storage assigning request asks to allocate 300-bit storage space to data Dx, and then space assigned to the data Dx may be called as the target storage space. Such description is only used to distinguish different space referred to in the context for understanding, but may not intend to limit the technical solutions of the present disclosure. It needs to be understood that the above mentioned "available storage size" and "target storage space" are virtual storage space. The virtual storage space may correspond to corresponding data, and then, the virtual storage space is mapped to actual physical space and address. However, in the context, in order to distinguish meanings, the virtual storage space is called as different names.

After the storage space is determined, corresponding space addresses may be assigned to the data. The space address may include a starting address and an offset, where the offset may be determined according to a size of the data.

In the above, when assigning the target storage space for the data, the current available storage size may be looked up, and then the suitable part of storage space may be assigned to the data. In the process of assigning the storage space, a specific space address may not be assigned temporarily. This separation of space allocation and address allocation is apparently different from the prior art, in which the storage space and the space address are assigned to data at one time.

According to an embodiment of the present disclosure, a tree structure that comprises a plurality of nodes may be created, where each node represents one storage space, and a suitable node for storing data may be found by traversing the storage space. The "suitable node" here may be one node or a combination of a plurality of nodes.

It needs to be understood that forming the tree structure between memory blocks may be implemented before the above mentioned step S210. In other words, the to-be-described tree structure later in detail may be formed in advance. The tree structure may be formed after the step S210 and before the step S220, which means forming the tree structure in real time through the space assigning request and the space releasing operation.

Figure 3:
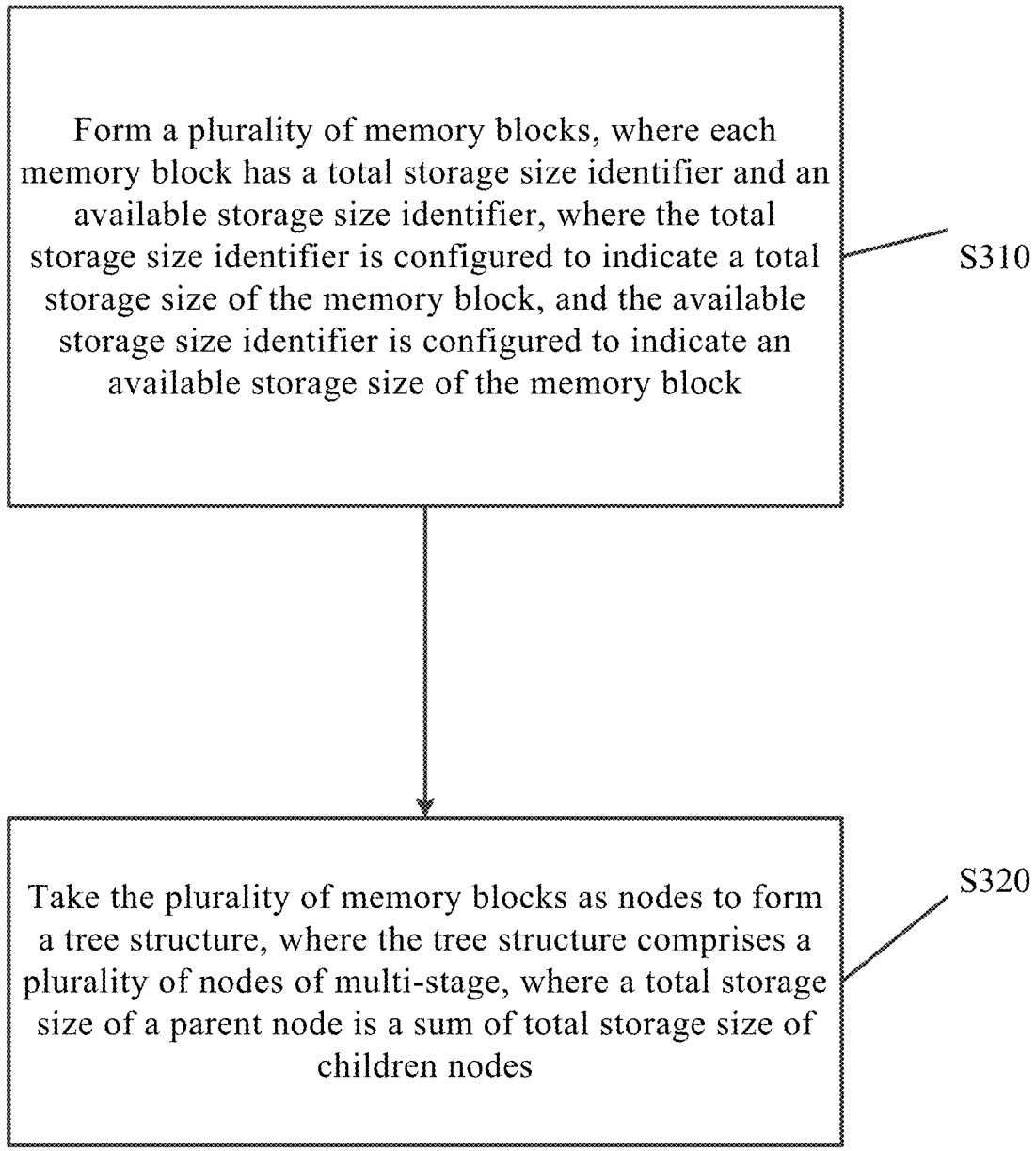
FIG. 3 is a flowchart of a method of forming a tree structure.

FIG. 3 is a flowchart of a method of forming the tree structure.

As shown in FIG. 3, methods of the present disclosure further include: at step S310, forming a plurality of memory blocks, where each memory block has a total storage size identifier and an available storage size identifier, where the total storage size identifier is configured to indicate total storage size of the memory block, and the available storage size identifier is configured to a indicate available storage size of the memory block; and at step S320, taking the plurality of memory blocks as nodes to form a tree structure, which comprises a plurality of nodes of multi-stage, where total storage size of a parent node is a sum of total storage size of children nodes.

Figure 4A:
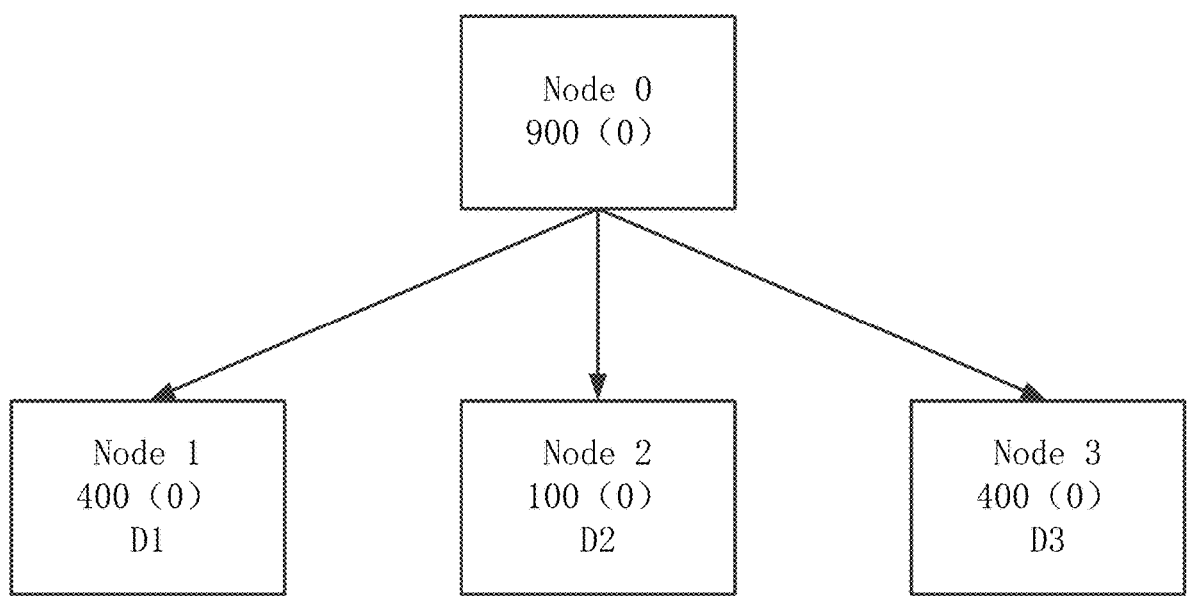
FIG. 4a to FIG. 4d are schematic diagrams of the tree structure according to an embodiment of the present disclosure.
Figure 4B:
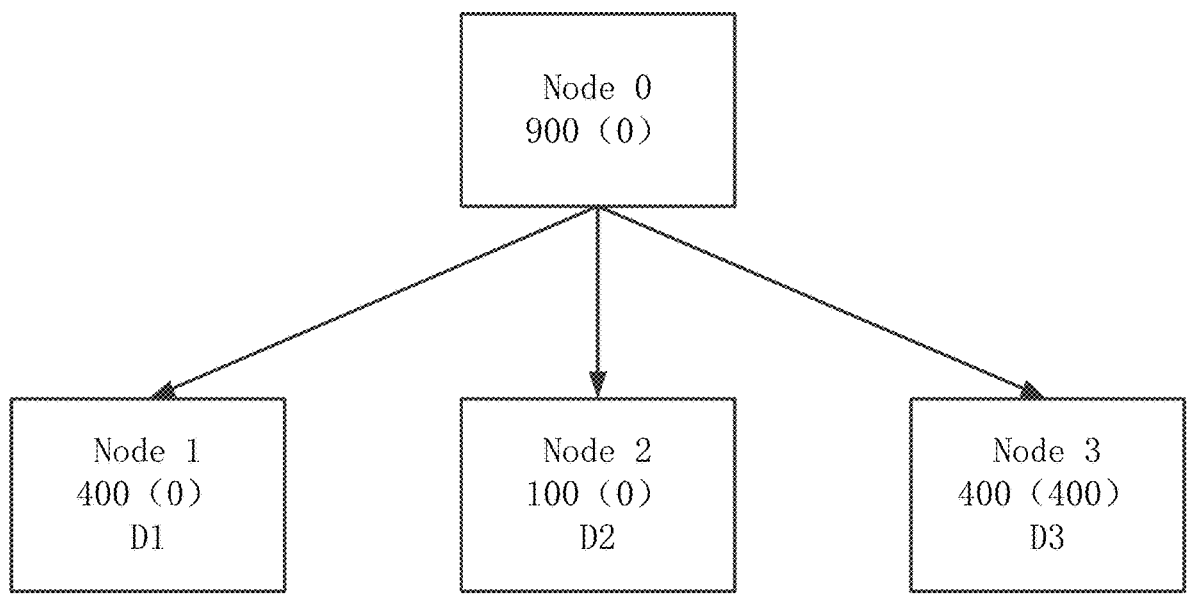
Figure 4C:
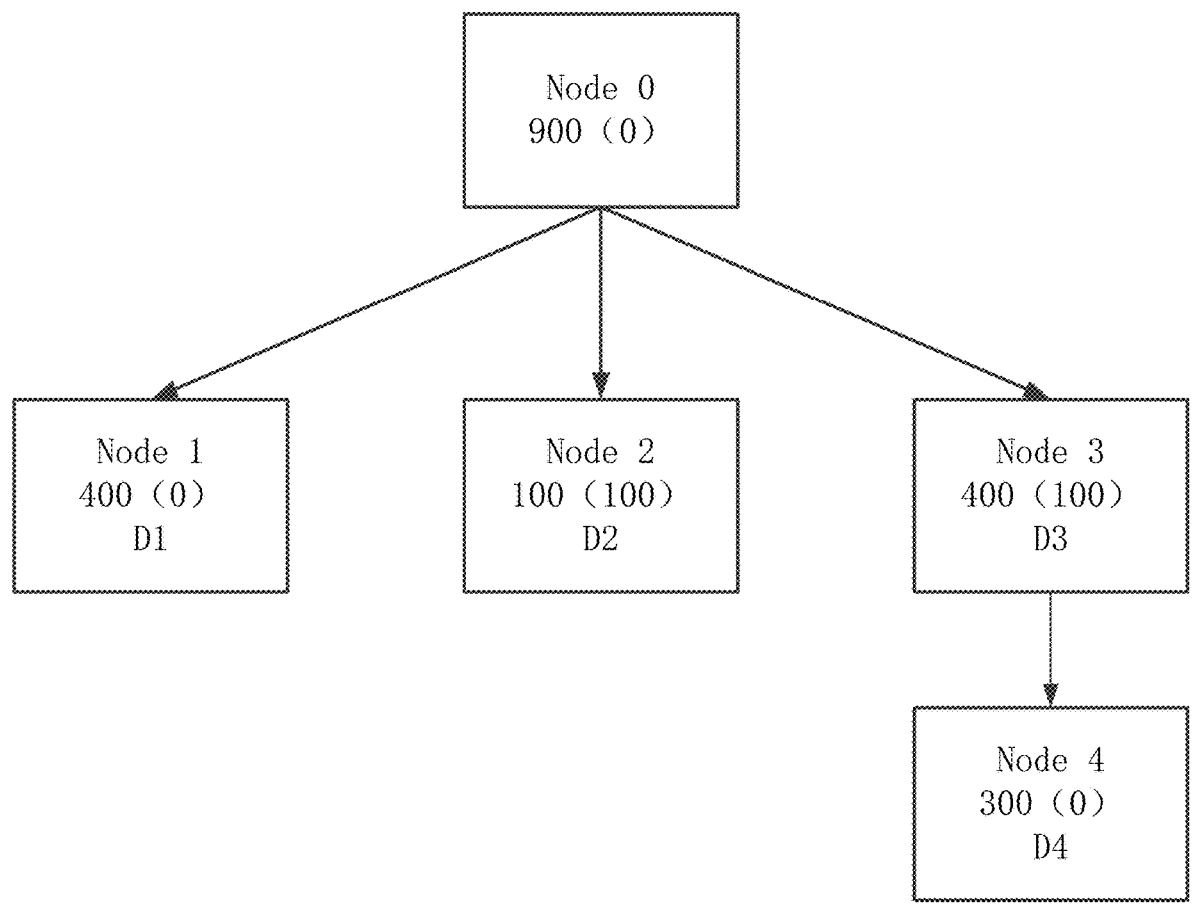

In order to facilitate the understanding of the methods in FIG. 3, the following may describe the forming process of the tree structure in detail in combination with the following operations and FIGS. 4a to 4c.

Operation 1: alloc D1 400.
Operation 2: alloc D2 100.
Operation 3: alloc D3 400.
Operation 4: dealloc D3.
Operation 5: alloc D4 300.
Operation 6: dealloc D2.

As shown in FIG. 4a, initialization may be performed first with assigning node 0 as an initialized node, where each node represents one memory block, the total storage size is 0, and the available storage size is 0; and for the convenience of description, a storage attribute may be represented as 0 (0).

Next, when receiving the instruction alloc D1 400 of the operation 1, a node 1 is created under the node 0 for storing the data D1. Therefore, total storage size of the node 1 is 400 bits, an available storage size of the node 1 is 0, and a storage attribute of the node 1 may be represented as 400 (0).

Next, when receiving the instruction alloc D2 100 of the operation 2, a node 2 under the node 0 for storing the data D2 is created. Therefore, total storage size of the node 2 is 100 bits, an available storage size of the node 1 is 0, and a storage attribute of the node 1 may be represented as 100 (0).

Next, when receiving the instruction alloc D3 400 of the operation 3, a node 3 under the node 0 for storing the data D3 is created. Therefore, total storage size of the node 3 is 400 bits, an available storage size of the node 1 is 0, and a storage attribute of the node 1 may be represented as 400 (0).

At this time, the total storage size of the node 0 is 900 bits, the available storage size of the node 0 is 0, and the storage attribute of the node 0 may be represented as 900 (0).

It may be understandable that the storage space may be released. According to an embodiment of the present disclosure and in response to the received space releasing request, corresponding nodes may be released, and identifiers of the available storage size of the released nodes may be updated.

The following may take FIG. 4b as an example for description. When receiving the instruction dealloc D3 of the operation 4, the space of the node 3 may be released. Therefore, the available storage size of the node 3 is 400, and the storage attribute may be represented as 400 (400) as shown in FIG. 4b. At this time, the total storage size of the initialized node 0 is 900 bits, the available storage size identifier of the node 0 is 0, and the storage attribute of the node 0 may be represented as 900 (0).

In the present disclosure, the released space may be used again to achieve the purpose of fully utilization of the space. Therefore, according to an embodiment of the present disclosure, assigning the target storage space to the data according to the received space assigning request includes: traversing the available storage size in the nodes of the tree structure; traversing the available storage size that is not less than a size of the data in the nodes of the tree structure; and assigning the target storage space to the data according to the received space assigning request.

Taking FIG. 4c as an example, receiving the instruction alloc D4 300 of the operation 5 means to request to allocate storage space with 300 bits to the data D4. At this time, only the node 3 has enough available storage size with 400 bits that is not less than a size of the storage space required to be assigned.

In this case, the data D4 may be directly stored in the storage space of the node 3, which does not need to create new nodes. However, the storage space originally assigned to data D3 in the node 3 is assigned to data D4, correspondence between the node 3 and the data D3 may be eradicated, which is not benefit for the storage of subsequent storage relation.

According to an embodiment of the present disclosure, traversing the available storage size in the nodes of the tree structure that is not less than the size of the data, and assigning the target storage space to the data according to the received space assigning request may include: creating a new node of the node whose available storage size is not less than the size of the data so that a total storage size of the new node is equal to the size of the data.

For example, a new node 4 may be created in a next level of the node 3, and a storage attribute of the node 4 may be represented as 300 (0). At this time, the available storage size of the node 3 is 100 bits, and the storage attribute of the node 3 may be represented as 400 (100) as shown in FIG. 4c.

Therefore, according to an embodiment of the present disclosure, in a logical level, one node may only be assigned once to make sure that one node corresponds to one piece of data. Therefore, the whole assigning process may be recorded completely, which is convenient for further splitting of children nodes. For example, the node 3 is assigned to the data D3 before, even though the space occupied by the data D3 is released, when new data (such as the data D4) requires to occupy the space originally occupied by the data D3, a new node (such as the node 4) is still required to be created. However, in physical space, the new created node 4 is still in the range of the physical space of the node 3.

Figure 4D:
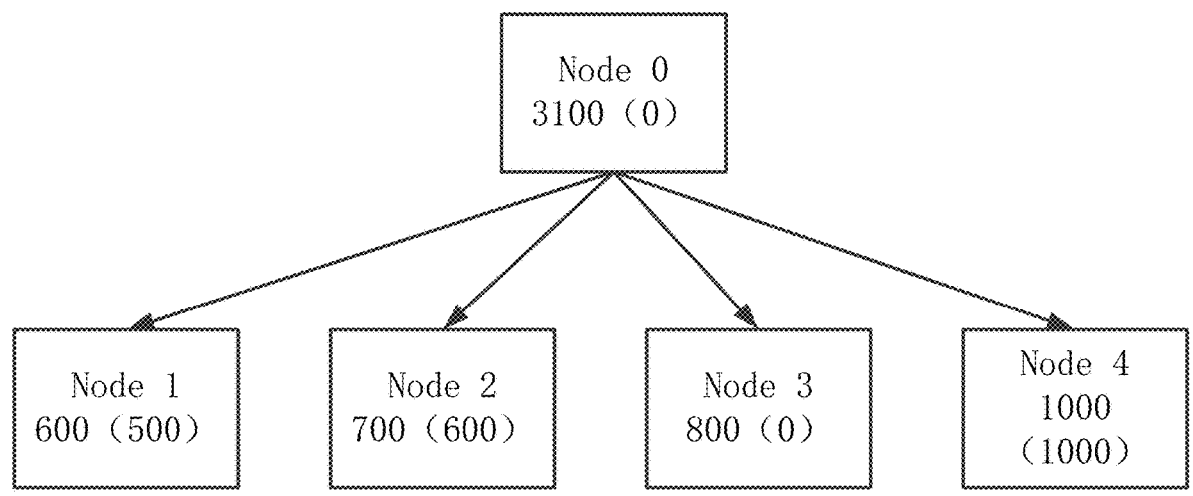

FIG. 4c shows a specific condition that available storage size of one node is bigger than required assigned space. FIG. 4d is a schematic diagram of assigning the space to the data according to another embodiment of the present disclosure.

In FIG. 4d, the node 1 has the total storage size of 600 bits and the available storage size of 500 bits; the node 2 has the total storage size of 700 bits and the available storage size of 600 bits; the node 3 has the total storage size of 800 bits and the available storage size of 0 bits; and the node 4 has the total storage size of 1000 bits and the available storage size of 1000 bits. At this time, a request to allocate storage space of 700 bits to the data is received. In this case, many schemes may be used to store the data.

In a first scheme, the node 4 is used to allocate storage space of 700 bits to the data, so that after the allocation, the node 4 may have available storage size of 300 bits.

In a second scheme, 500-bit available storage size of the node 1 is occupied, and then 200-bit storage space is assigned from the node 2 or the node 4.

In a third scheme, 600-bit available storage size of the node 2 is occupied, and then 100-bit storage space is assigned from the node 1 or the node 4.

In a forth scheme, total 700-bit storage space is assigned from the node 1, node 2 and node 4; for example, 200-bit storage space may be assigned from the node 1, 300-bit storage space may be assigned from the node 2, and 200-bit storage space may be assigned from the node 4.

Adopting the first scheme is benefit to make it easier for the newly assigned space to keep continuity in address, thereby decreasing hopping of addresses in the process of data access, and then increasing efficiency of data access.

Adopting the second and the third scheme is benefit to decrease fragmentation of the space as much as possible. Besides, the method of assigning the storage space to the data by using the node 1 and the node 2 is also benefit to the data to be stored in continuous space, thereby decreasing hopping of addresses in the process of data access.

In addition, in such a condition that the available storage size of the node 1 and the node 2 may not form a continuous address, the third scheme is better than the second scheme, for that more data is stored in the node 2, which is benefit to decrease hopping of addresses in the process of data access.

According to an embodiment of the present disclosure, a single node with available storage size that is not less than the size of the data is not found in the nodes of the tree structure, so that a new node is created to make sum of available storage size of the single node and the new node is not less than the size of the data.

The following may still take FIG. 4d as an example.

In a fifth scheme, available storage size of 500 bits in the node 1 is occupied, and then a new node with available storage size of 200 bits is applied; and a sum of the available storage size of the node 1 and the available storage size of the new node is 700 bits, which may hold the data.

In a sixth scheme, available storage size of 600 bits in the node 2 is occupied, and then a new node with available storage size of 100 bits is applied; and a sum of the available storage size of the node 2 and the available storage size of the new node is 700 bits, which may hold the data.

In the embodiment, the new node may form continuous space with the above mentioned single node.

Compared with the second and the third scheme, advantages of the fifth and the sixth schemes lie in that if the space in the node 1 and the node 2 is not continuous, space hopping in the data access process may easily lead to low efficiency, but by adopting the fifth and sixth schemes, new nodes before or after the node may be created to form continuous space.

In the embodiment, a single node with largest available storage size is selected to make the available storage size of the newly created node as small as possible.

Compared with the fifth scheme, the storage space of the newly created node of the sixth scheme is relatively small, which is benefit to decrease fragmentation of the space.

Next, still as shown in FIG. 4c, when receiving the instruction dealloc D2 of the operation 6, the space of the node 2 may be released. Therefore, the available storage size of the node 2 is 100 bits, and the storage attribute of the node 2 may be represented as 100 (100) c.

It may be seen from the above-mentioned description that a node, once is created, may not be deleted in a certain period even though an instruction to release storage space is received, but may adjust an identifier of available storage size to indicate current available storage size.

Figure 5:
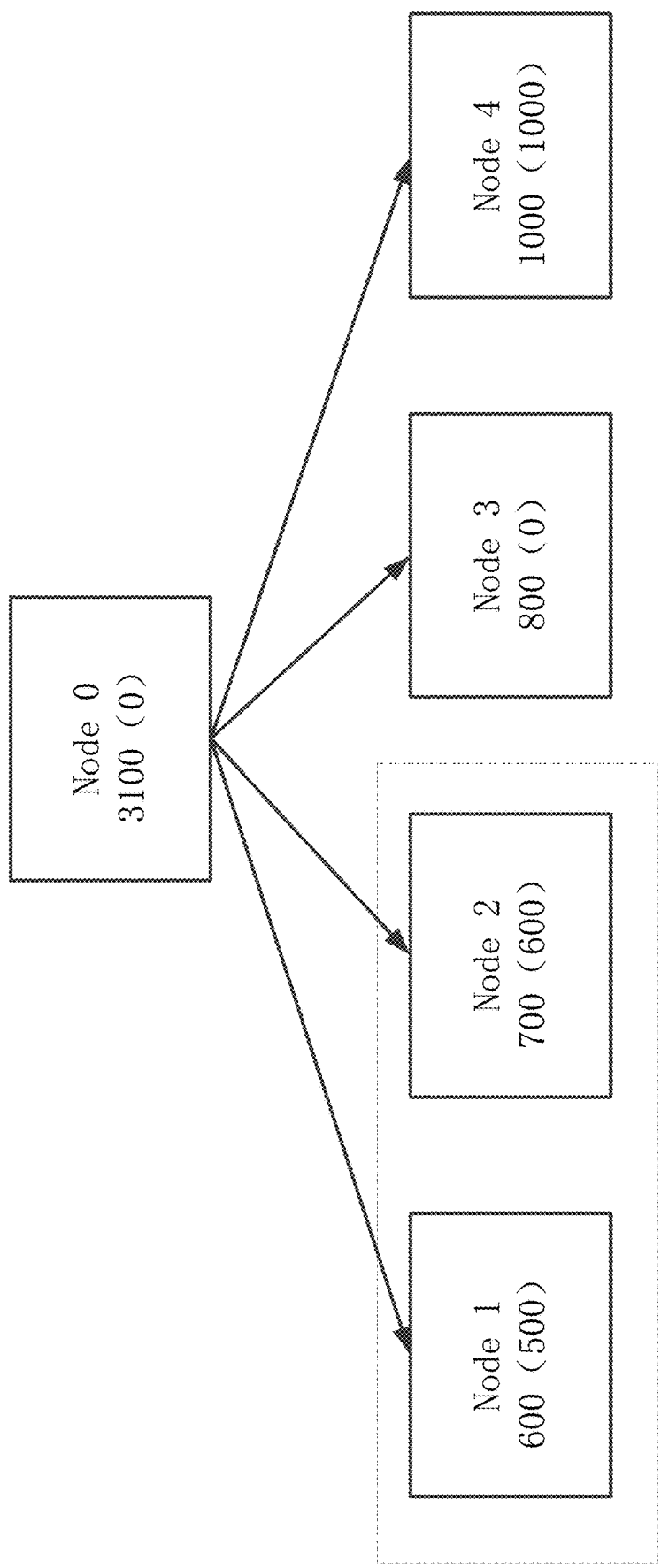
FIG. 5 is a schematic diagram of assigning target storage space to the data according to an embodiment in preferred embodiments of the present disclosure.

FIG. 5 is a schematic diagram of assigning target storage space to the data according to an embodiment in the preferred embodiments of the present disclosure.

According to an embodiment of the present disclosure, since available storage size with a smallest difference with the size of the data is found in the nodes of the tree structure, assigning the target storage space to the data according to the received space assigning request.

As shown in FIG. 5, the node 0 has four children nodes, which are node 1 (600 (500)), node 2 (700 (600)), node 3 (800 (0)) and node 4 (1000 (1000)). At this time, the operation instruction alloc D5 1000 is received. In the above mentioned four nodes, a sum of the available storage size of the node 1 and the node 2 is 1100 bits, which is enough to hold the data D5; the available storage size of the node 3 is 0, which is not enough to hold the data D5; and the available storage size of the node 4 is 1000 bits, which is just enough to hold the data D5. According to an embodiment of the present disclosure, in a case that the node 4, a combination of the node 1 and the node 2 may hold the data D5, the node 4 may be chosen preferentially to hold the data D5, because the difference between the available storage size of the node 4 and the size of data D5 is the smallest. The above mentioned preferred embodiments are benefit to decrease fragmentation and increase utilization of the storage space.

It needs to be understood that the above mentioned expression "the available storage size has a smallest difference with a size of the data D5" is not only suitable for the above mentioned situation that the available storage size of the single node is not less than the size of the data, but also suitable for a situation that the available storage size of the single node is larger than the size of the data.

For example, still as shown in FIG. 5, the available storage size of the node 1 is 500 bits, the available storage size of the node 2 is 600 bits, and the available storage size of the node 4 is 1000 bits; and at this time, a data assigning request is received, asking for assigning 400-bit storage space to the data D5. In an embodiment, the corresponding 400-bit storage space assigned to the data D5 may be assigned from the node 1, the node 2 or the node 4. In another preferred embodiment of the present disclosure, the corresponding 400-bit storage space assigned to the data D5 may be assigned from the node 1, for the available storage size in the node 1 has a smallest difference with the size of data D5. This is helpful to decrease the fragmentation of the space, thus the space may be fully utilized.

The above has described the situation of forming the tree structure, and there is another case that a sum of the available storage size of all the existed nodes is not enough to hold the data. According to an embodiment of the present disclosure, assigning the target storage space to the data according to the received space assigning request further including: available storage size that is not less than the size of the data is not found in the nodes of the tree structure, so that a new node is created so that the available storage size of the new node holds the data.

It may be understood that preferably, the storage space of the new node should be as small as possible, for the purpose to decrease fragmentation of the space.

The following may introduce a plurality of embodiments of creating new nodes in detail.

Figure 6A:
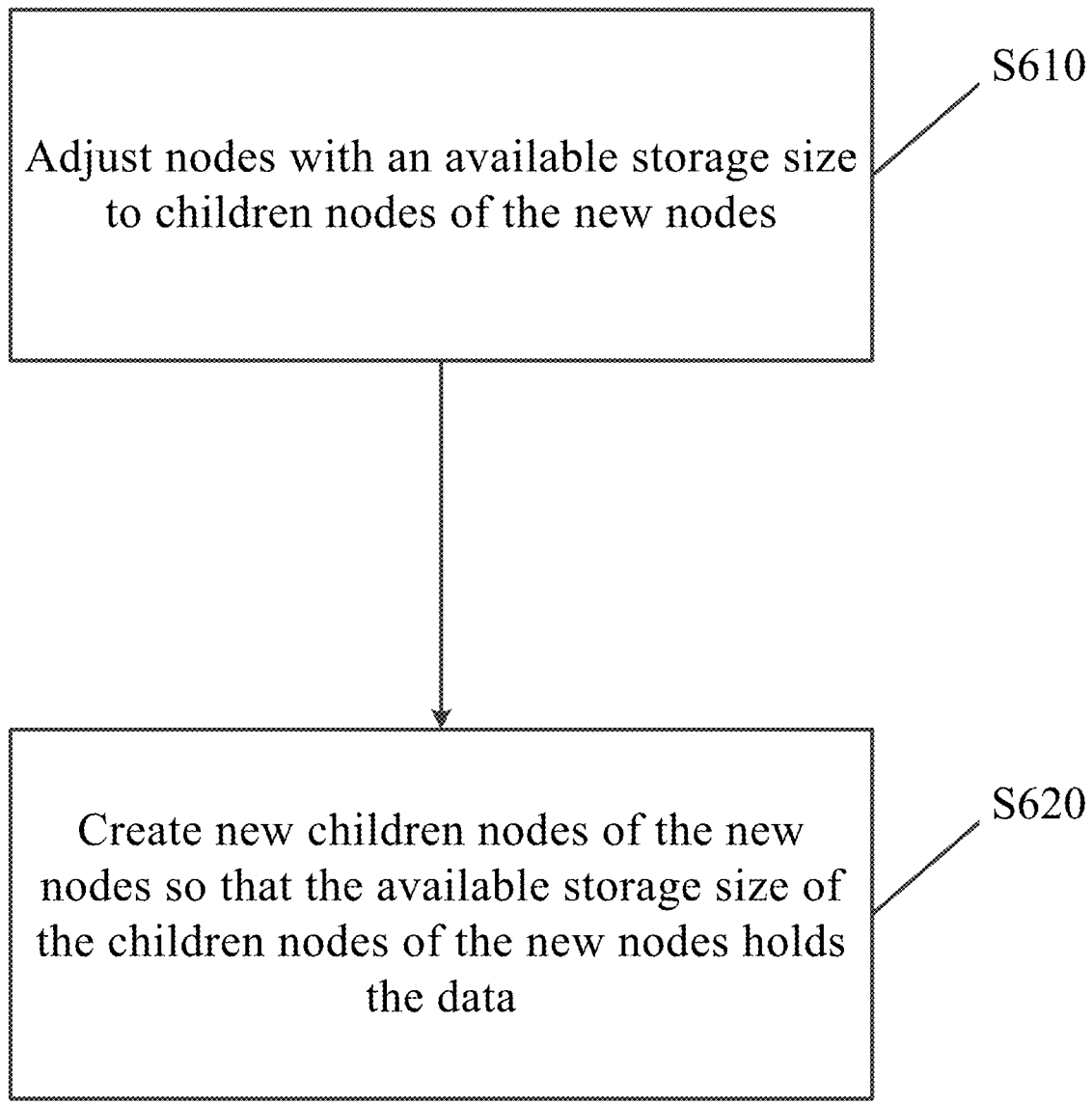
FIG. 6a is a flowchart of a method of creating new nodes according to an embodiment of the present disclosure.
Figure 6B:
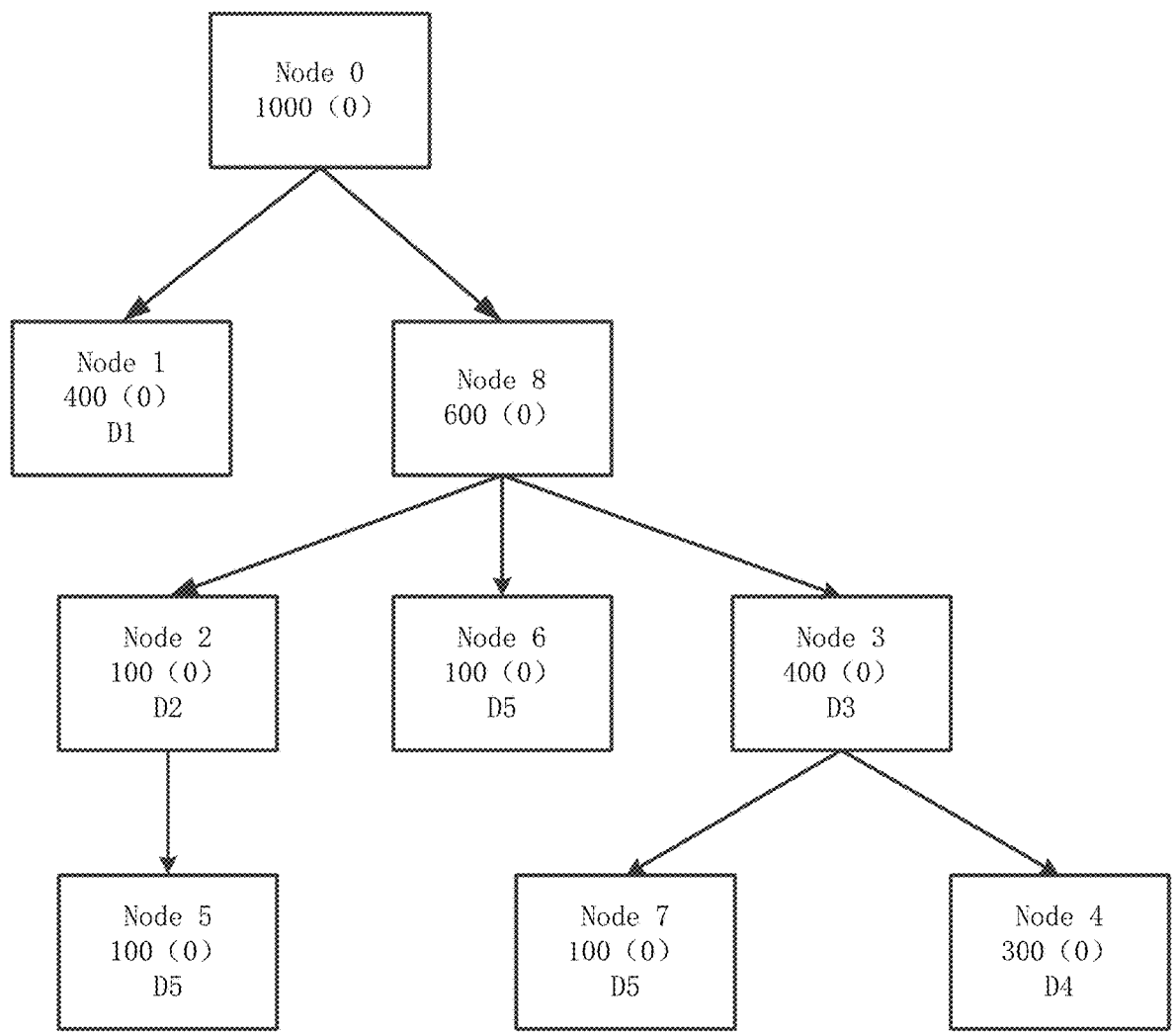

FIG. 6a is a flowchart of a method of creating the new nodes according to an embodiment of the present disclosure; and FIG. 6b is a schematic diagram of creating the new nodes according to the flowchart shown in FIG. 6a.

As shown in FIG. 6a, creating the new nodes may include: at step S610, adjusting nodes with an available storage size to children nodes of the new nodes; and at step S620, creating new children nodes of the new nodes so that the available storage size of the children nodes of the new nodes holds the data.

With reference to the above mentioned 6 operations described in combination with FIG. 4a to FIG. 4b, the following may make description with reference to operation 7 to operation 10.

Operation 7: alloc D5 300.
Operation 8: dealloc D1.
Operation 9: dealloc D4.
Operation 10: dealloc D5.

First, it may be seen from FIG. 4c that after execution of the operation 6, the available storage size of the node 1 is 0, the available storage size of the node 2 is 100 bits, the available storage size of the node 3 is 100 bits, and the available storage size of the node 4 is 0, so that current total available storage size is 200 bits.

When executing the operation 7, storage space of 300 bits is required to be assigned to the data D5, but the current available storage size is only 200 bits, which is not enough to hold the data D5. In such a case, new nodes are required to be created.

Therefore, a node 8 at the same level as the node 1 is created, and the original node 2 and node 3 are moved to a next level of the new node 8 and set as children nodes of the new node 8. In such a case, a new children node 6 may be created, and the children node 6 has an identifier 100 of total storage size; therefore, the children node 2, the new children node 6 and the children node 3 have total available storage size of 300 bits, which may hold the data D5.

Further, the data D3 is stored in the children node 3 before, so that the children node 3 is required to be divided into a grand-children node 7 and a grand-children node 4, where the grand-child 4 is a children node of the children node 3 before, and the grand children node 7 is a newly created grand-children node.

Further, as mentioned before, in an embodiment, the same node may only be assigned to the same data. Therefore, the node 2 has available storage size of 100 bits, but the node 2 is assigned to the data D2 before, so that a new node 5 may be created under the node 2 to be set as a children node of the node 2. It needs to be understood that the node 2 and the node 5 are the same node in the physical space of the memory, but are different nodes in the tree structure.

After the above mentioned creating process, the node 5 may provide storage space of 100 bits, the node 6 may provide storage space of 100 bits, and the node 7 may provide storage space of 100 bits, so that the data D5 with the size of 300 bits may be hold.

It may be seen from the above mentioned description of the FIG. 6b that the same data may occupy different nodes; for example, the data D5 may occupy the node 5, the node 6 and the node 7. However, the same node may only correspond to one piece of data; for example, the node 3 is assigned to the Data D3, even though the space occupied by the data D3 is released (the operation 4), when the new data such as the data D4 and the data D5 are required to occupy the space originally occupied by the data D3, the node 3 still needs to be further divided into the node 4 and the node 7. The above mentioned scheme is benefit to keep the whole correspondence between the nodes and the data.

Figure 6C:
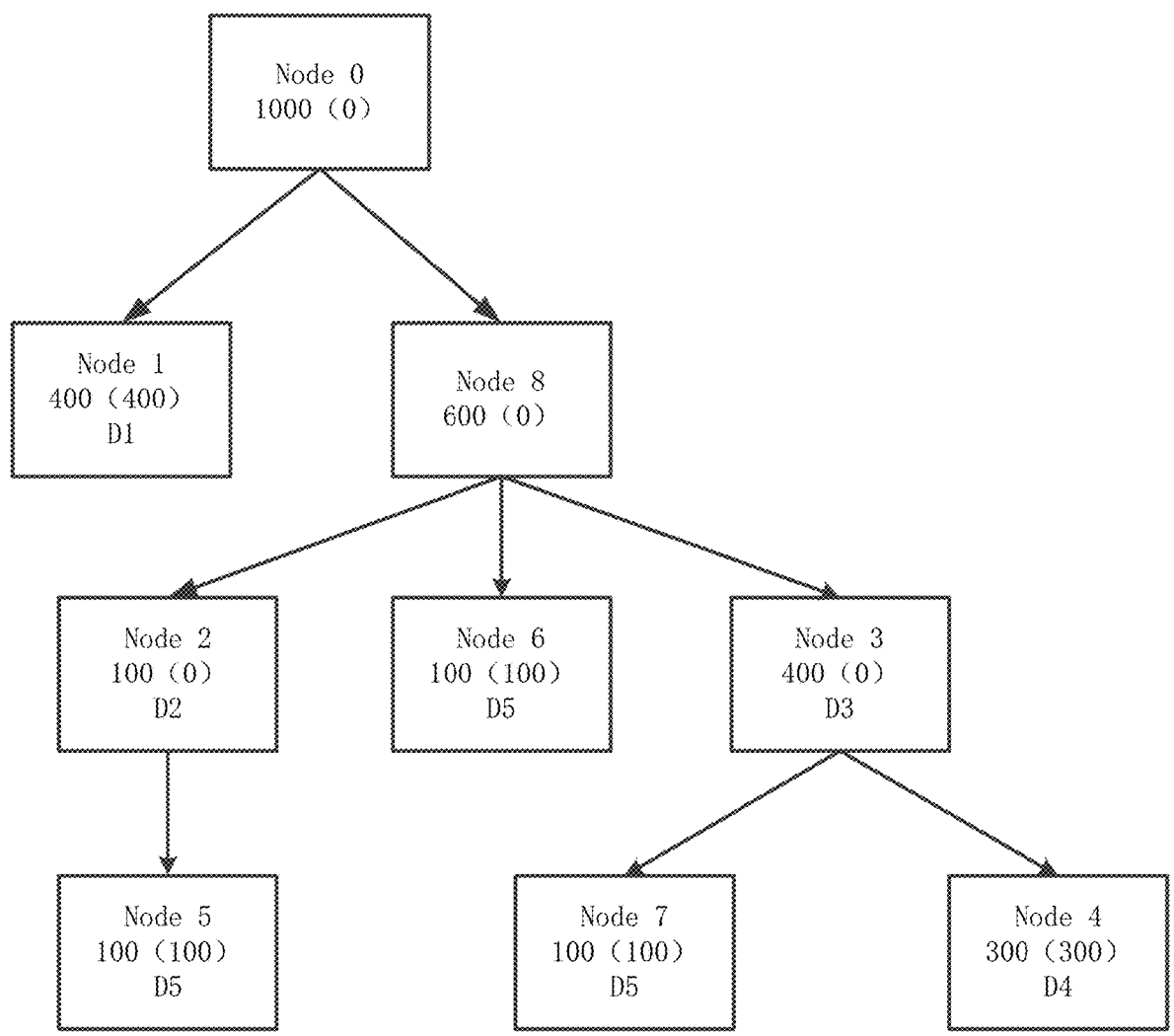

For the operation 8 to the operation 10, the storage space assigned to the data D1, D4 and D5 may be released, as shown in FIG. 6c. In FIG. 6c, the available storage size of the node 1 becomes 400 bits, the available storage size of the node 6, node 5 and node 7 becomes 100 bits, and the available storage size of the node 4 becomes 300 bits.

According to an embodiment of the present disclosure, creating new nodes so that the available storage size holds the data may include: since an available storage size of all the nodes in the tree structure is 0, creating new nodes so that the available storage size of the new nodes holds the data.

In this embodiment, there is no available storage size in the existed nodes, so that a node of information may be fully created to store the data. The situation described in FIG. 4a is actually an implementation of this embodiment, which may not be repeated here.

According to another embodiment of the present disclosure, creating new nodes so that the available storage size holds the data may include: since current available storage size that is not less than the size of the data is found in the nodes of the tree structure, and a size of data included in a next space assigning request is no larger than the current available storage size, creating new nodes so that the available storage size of the new nodes holds the data.

In this embodiment, timing of the space assigning request may be considered. For example, if existed available storage size is 300 bits, and then a received first space assigning request asks to allocate storage space of 400 bits, then it should be considered whether the second space assigning request after this space assigning request is less than or equal to 300 bits; and if the required space is less than or equal to 300 bits, a new node may be created first assigning to the first space assigning request, and the existed available storage size may be reserved to the second space assigning request. This embodiment is benefit to a periodical or a predictable space assigning request.

After the tree structure is formed and a new space assigning request is received, the tree structure may be traversed to find expected available storage size. According to an embodiment of the present disclosure, when traversing the tree structure, a depth first scheme may be adopted; and the depth first scheme means that after traversing a parent node and all children nodes of this parent node, traversing another node at the same level as the above mentioned parent node.

Taking FIG. 6c as an example, when receiving a space assigning request, the node 1 is required to be searched first; and when there is no enough available storage size searched in the node 1, the node 8 needs to be searched, and then the node 2, the node 5, the node 6, the node 3, the node 7 and the node 4 need to be searched. The depth first scheme is benefit to store the same data in continuous space, thereby decreasing hopping of data addressing of space in a computation process.

Another embodiment of the present disclosure further includes adjusting position of the nodes to make space of the plurality of memory blocks be continuous.

It needs to be understood that the nodes correspond to virtual storage space, so that making the same data be stored in the continuous space may decrease the hopping of data addressing of space in the computation process, and then improving computation efficiency.

As shown in FIG. 6b, the node 6 used to store the data D5 is inserted between the node 2 and the node 3, and the node 7 is closed created by the node 6; therefore, the data D5 may be continuously stored in continuous space closely to the node 5, the node 6 and the node 7. The node 6 may also be set after the node 3, and the node 7 may be set after the node 4, but such a method may be easy to cause space hopping.

Therefore, to keep continuity of the space, an embodiment of the present disclosure further includes fixing order of the nodes in the tree structure.

The method of fixing the order of the nodes may be marking the parent node of the nodes. For example, as shown in FIG. 6b, a mark "ordered" may be made on the node 8, and then the order of all children nodes under the node 8 may be fixed. For another example, the mark "ordered" may be made on the node 3, and then the order of the node 7 and the node 4 under the node 3 may be fixed.

Fixing the order of the nodes is benefit to store the same data in the continuous space, thereby decreasing the hopping of space addressing.

Different from the prior art, in the above mentioned process, only the storage space is assigned, but addresses are not assigned to the data, which means that the space assigning and the address assigning are separated; however, in the prior art, the space and the address are assigned at one time, which is a difference between technical solutions of the present disclosure and technical solutions of the prior art.

After assigning the storage space to the data based on the above mentioned process, according to an embodiment of the present disclosure, based on the assigned target storage space, allocating the space address to the data may include: after allocating the space address to one node, assigning addresses to other nodes at the same level, where the address of each node includes addresses of all children nodes of the node.

Further, when the sum of the available storage size of all the nodes is less than the size of the data to be held, the fifth and the sixth schemes described combined with the FIG. 4d are also applicable. In this case, new nodes must be created. Similar to the fifth and the sixth schemes, a node may be chosen to hold a part of the data, and then new nodes may be created to hold a left part of the data. The new created nodes may form continuous space with the nodes that hold a part of the data, thereby decreasing the space hopping in the process of data access.

Figure 7:
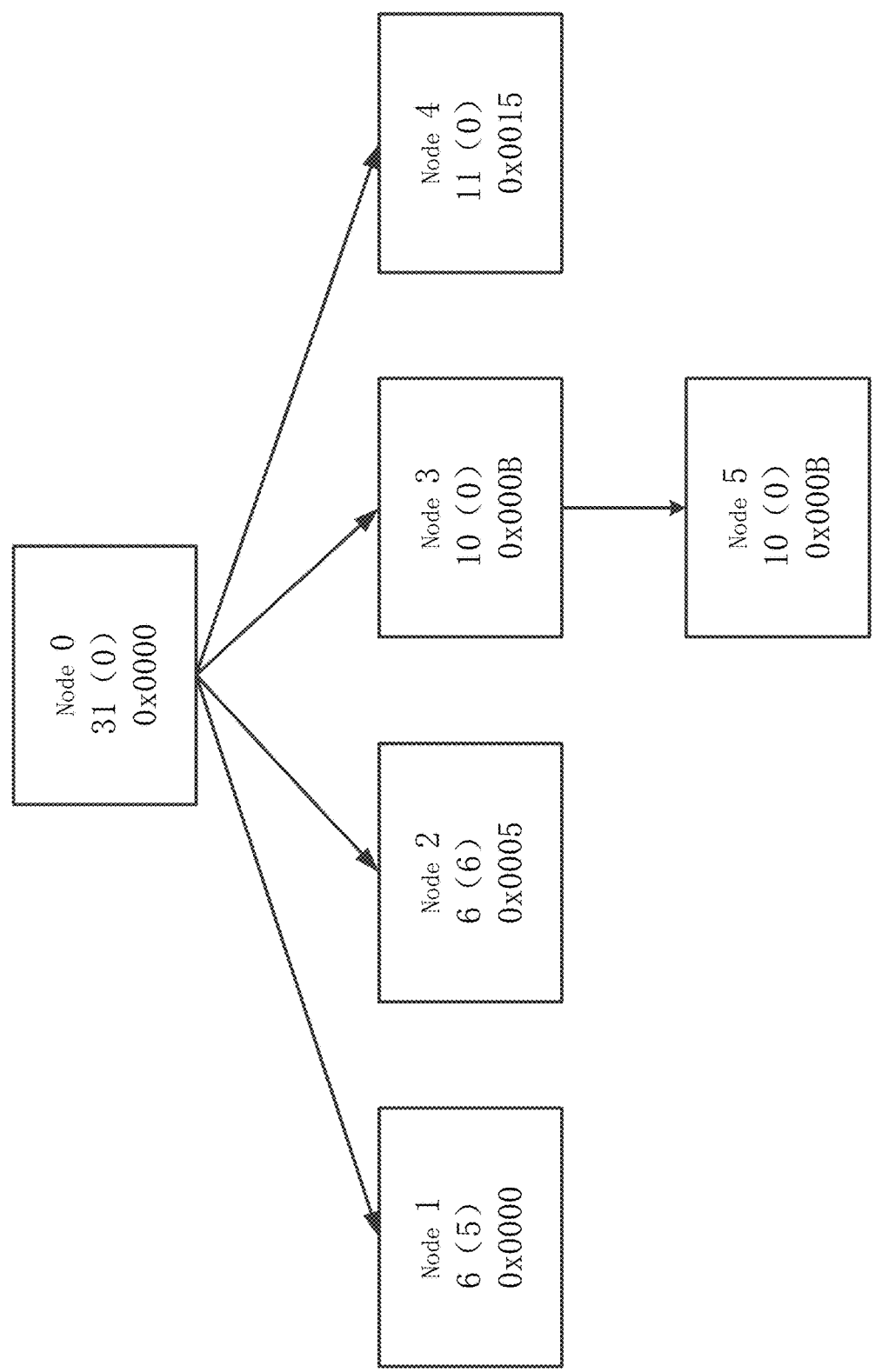
FIG. 7 is a schematic diagram of assigning an address to the storage space according to an embodiment of the present disclosure.

FIG. 7 is a schematic diagram of assigning the address to the storage space according to an embodiment of the present disclosure.

The tree structure shown in FIG. 7 includes a node 0, a node 1, a node 2, a node 3, a node 4 and a node 5. The node 0 is a root node with total storage size of 31 bits and available storage size of 0 bits, and a storage attribute of the node 0 is represented as 31 (0); the node 1, the node 2, the node 3 and the node 4 are children nodes of the node 0, and their storage attributes are respectively represented as 5 (5), 6 (6), 10 (0) and 11 (0); and the node 5 is a children node of the node 3, and the storage attribute is represented as 10 (0).

A width-first scheme is adopted when assigning addresses to these nodes, which means assigning addresses to the nodes at the same level, and then specifically assigning addresses to children nodes of each node.

As shown in FIG. 7, a starting address of the node 0 is 0x0000 with an offset of 31; and as a first children node of the node 0, a starting address of the node 1 may also be 0x0000 with an offset of 5, so that an ending address of the node 1 is 0x0004. Similarly, a starting address of the node 2 may be 0x0005 with an offset of 6; a starting address of the node 3 may be 0x000B with an offset of 10; a starting address of the node 4 may be 0x0015 with an offset of 11; and as a children node of the node 3, a starting address of the node 5 may be 0x000B with an offset of 10.

It may be seen that from the above mentioned arrangement, the space of the same data may be kept continuous, so that continuous addresses may also be assigned, thereby greatly improving space utilization in the memory, and decreasing fragmentation, which has significant meaning to the memory with a relatively small storage space. Besides, through technical solutions of the present disclosure, continuity of data storage may be kept, thus avoiding hopping of addressing and improving speed of data throughput; and another benefit is that since all node information is kept, all records of data storage in the process of space assigning and releasing are kept, which is convenient for reserving of records of subsequent data tracking and storing.

Figure 8:
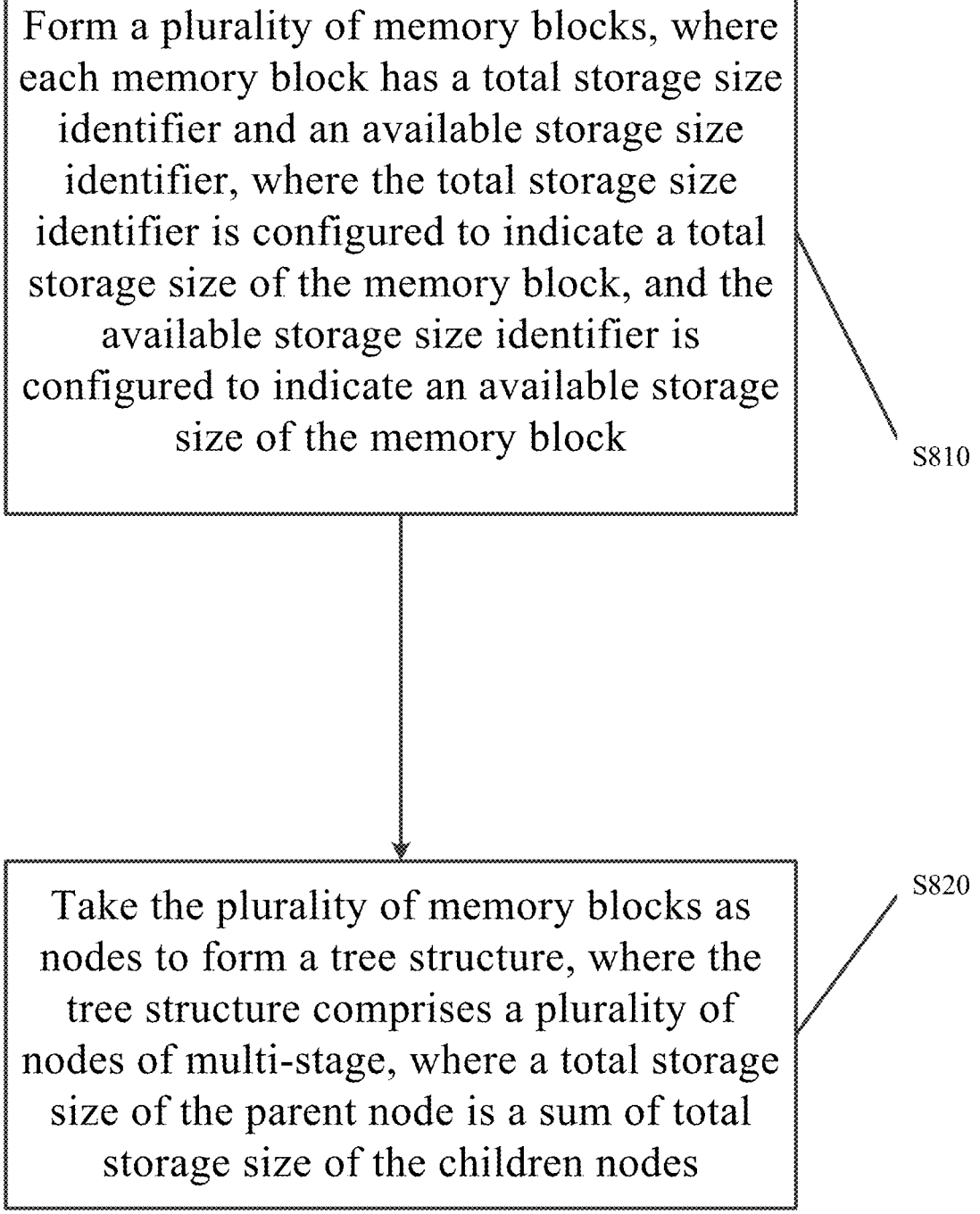
FIG. 8 is a method of managing the storage space according to an embodiment of the present disclosure.

FIG. 8 shows a method of managing the storage space according to an embodiment of the present disclosure, including: at step S810, forming a plurality of memory blocks, where each memory block has a total storage size identifier and an available storage size identifier, where the total storage size identifier is used to indicate total storage size of the memory block, and the available storage size identifier is used to indicate available storage size of the memory block; and at step S820, taking the plurality of memory blocks as nodes to form a tree structure, which comprises a plurality of nodes of multi-stage, where total storage size of the parent node is a sum of total storage size of the children nodes.

Figure 9:
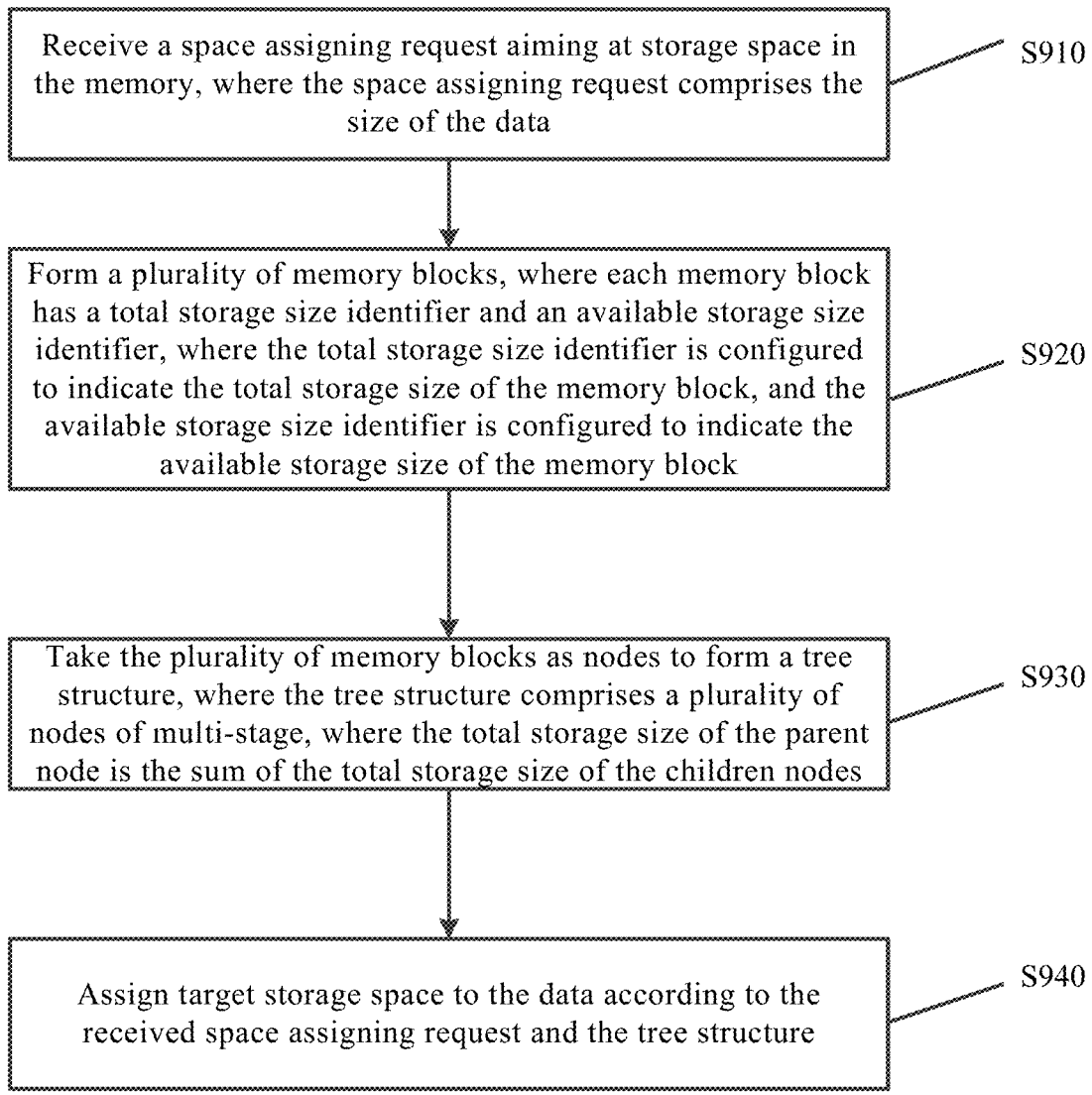
FIG. 9 is a method of assigning the storage space to data in the memory according to an embodiment of the present disclosure.

FIG. 9 is a method of assigning the storage space to the data in the memory according to an embodiment of the present disclosure, including: at step S910, receiving a space assigning request aiming at storage space in the memory, where the space assigning request comprises the size of the data; at step S920, forming a plurality of memory blocks, where each memory block has a total storage size identifier and an available storage size identifier, where the total storage size identifier is configured to indicate the total storage size of the memory block, and the available storage size identifier is configured to indicate the available storage size of the memory block; at step S930, taking the plurality of memory blocks as nodes to form a tree structure, which comprises a plurality of nodes of multi-stage, where the total storage size of the parent node is the sum of the total storage size of the children nodes; and at step S940, according to the received space assigning request and the tree structure, assigning target storage space to the data.

Specific implementation of each operation in the above mentioned FIG. 8 and FIG. 9 is explained in detail according to FIG. 2 to FIG. 7, and may not be repeated here.

Figure 10:
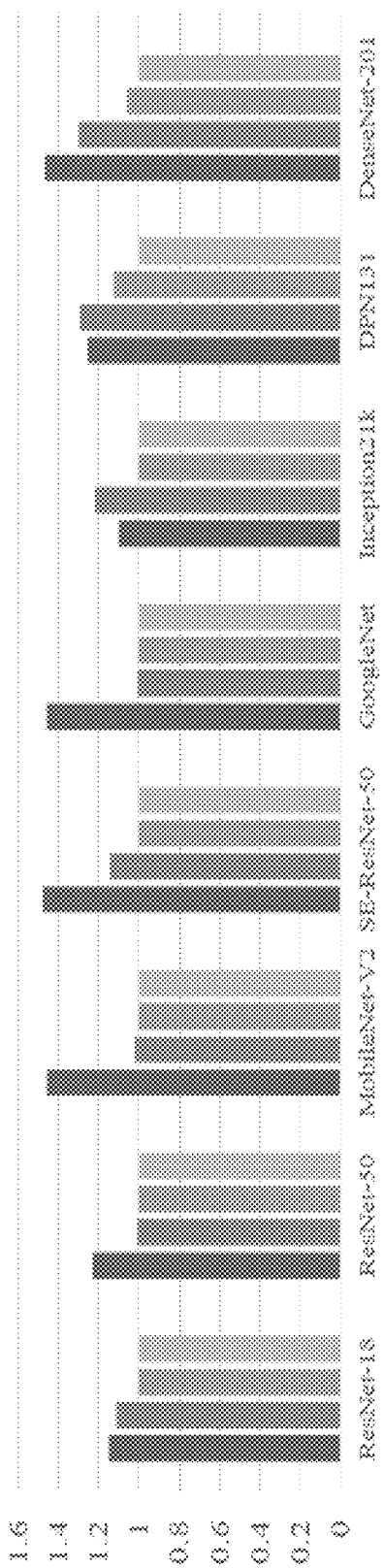
FIG. 10 is a comparison diagram of the amount of space used in different application scenarios according to technical solutions of the present disclosure and three other kinds of technical solutions (a BF (best fit) scheme, a GC (graph coloring) scheme and an ideal scheme).

FIG. 10 is a comparison diagram of space using numbers in different application scenarios of the technical solutions of the present disclosure and three other kinds of schemes (a BF (best fit) scheme, a GC (graph coloring) scheme and an ideal scheme), where in each group of comparison, data in the left represents the BF scheme, data in a second column represents the GC scheme, data in a third column represents the technical solutions of the present disclosure, and data in a last column represents the ideal scheme.

FIG. 10 selects 8 common application scenarios, which are represented by abscissas ResNet-18, ResNet-50, MobileNet-V2, SE-ResNet-50, GoogleNet, Inception21k, DPN131 and DenseNet-201; and ordinates represent usage of an SPM space, which is a key measure to evaluate the method of memory management. In FIG. 10, usage of the SPM space in all schemes is dealt with normalization according to the ideal scheme.

In average, compared with the BF scheme and the GC scheme, the technical solutions of the present disclosure decrease the usage of the SPM space by 31.6% and 13.3%, respectively. Compared with the BF scheme, the technical solutions of the present disclosure decrease the usage of the SPM space by up to 47.9% (such as in the SE-ResNet-50 scenario), and by at least 10% (such as in the Inception21k scenario). Compared with the GC scheme, the technical solutions of the present disclosure decrease the usage of the SPM space by about 1% (ResNet-50) to 30.1% (DenseNet-201).

Further, in the above mentioned six application scenarios, such as in the ResNet-18, ResNet-50, MobileNet-V2, SE-ResNet-50, GoogleNet and Inception21k application scenarios, the technical solutions of the present disclosure nearly reach a same effect as the ideal scheme.

The above described an embodiment to allocate suitable storage space to fixed-value data. The following may further describe an embodiment of assigning suitable storage space to data represented by a function and with an unknown size.

FIG. 1a to FIG. 1c are schematic diagrams of different methods of assigning storage space, where FIG. 1a is a schematic diagram of a general neural network computation, which is described above and may not be repeated here.

Figure 11:
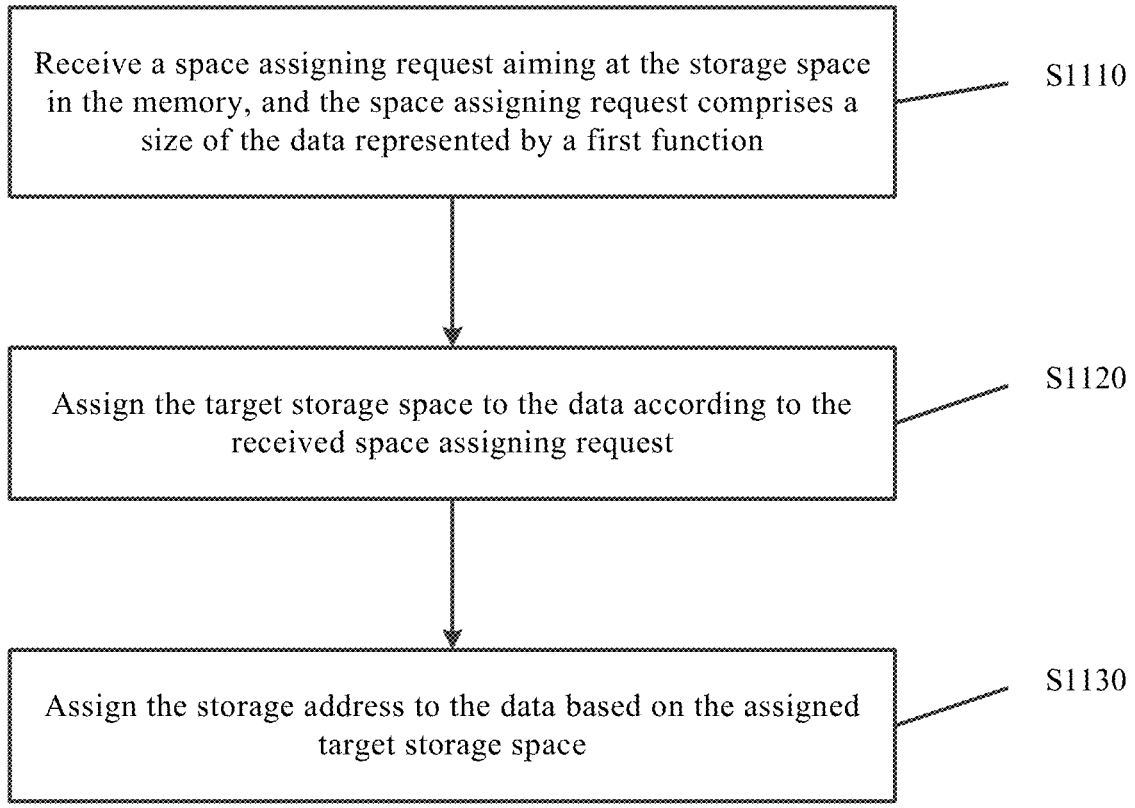
FIG. 11 is a flowchart of a method of allocating the space address to the data in a memory according to an embodiment of the present disclosure.

FIG. 11 is a method of allocating a space address to the data in the memory according to an embodiment of the present disclosure, including: at step S1110, receiving a space assigning request for the storage space in the memory, and the space assigning request comprises a size of the data represented by a first function; at step S1120, assigning the target storage space to the data according to the received space assigning request; and at step S1130, allocating the space address to the data based on the assigned target storage space.

It needs to be understood that in the above mentioned context, except for the size of the data, the space assigning request may carry other information, such as life circle of resources, including application time, releasing time of resources represented by the life circle, and orders of the application and the releasing. Different orders may lead to different results. In the present disclosure, the data is not an immediate value, but is represented as a function, which includes unknown variables. These unknown variables are certain only in runtime, but are uncertain values when assigning the storage space to the data.

The following takes four-dimensional data as an example, whose size may be represented as S=N*H*W*C, where parameters N, H, W and C are all positive natural numbers, and at least one of these four parameters is variable. For easier understanding, if a size of input of an original network is supposed as 1*H*W*3, where H and W are unknown parameters, after a plurality of layers of the neural network, the size of the input in an X layer becomes 1*f1(H)*f2(W)*3; and at this time, f is determined according to parameters of operators from a first layer to the X layer, and f1(H)>0, f2(W)>0. Since in the neural network, f1 and f2 are all polynomials of the highest degree, conditions of the minimum size of the parameter H and the parameter W may be obtained according to the inequality, for example, H>x1, and W>x2.

After a whole network computation, constraints of the whole neural network to the parameter H and the parameter W are obtained. It is supposed that H=h+x1 and W=w+x2, which are substituted to 1*f1(H)*f2(W)*3, each data block expression in the original network only has a + sign, where x1 and x2 are the minimum values of constraints of the neural network. The network structure is required to guarantee that the size of the last layer of the computation may not be 0, so that for the whole network computation, constraints on H and W are required. Therefore, the size of the data, for example, may be represented as P1hw+P2h+P3w+P4, where P1, P2, P3 and P4 are all nonnegative integers.

The following is a group of exemplary space assigning instructions and space releasing instructions. In order to have a better understanding on the technical solutions of the present disclosure, operations 1-8 are executed according to a chronological order.

Operation 1: Alloc A 10hw+5h+5w+20.
Operation 2: alloc A1 9hw+4h+6w+5.
Operation 3: alloc A2 hw+h+10w+8.

Operation 4: Dealloc A.
Operation 5: alloc B 8hw+10h+10w+100.
Operation 6: alloc C 4hw+20h+20w+50.
Operation 7: dealloc B.
Operation 8: alloc D 12hw+5h+5w+10.

The instruction "alloc" represents assigning the storage space, and the instruction "dealloc" represents releasing the storage space. For example, the operation 1 "Alloc A 10hw+5h+5w+20" represents assigning space with a size of 10hw+5h+5w+20 to data A; the operation 5 "alloc B 8hw+10h+10w+100" represents assigning space with a size of 8hw+10h+10Ww+100 to data B; the operation 4 "Dealloc A" represents releasing the space occupied by the data A; and the operation 7 "dealloc B" represents releasing the space occupied by the data B.

Next, after the space assigning request is received, a suitable part of storage space chosen from the available storage size or all the storage space may be taken as target storage space assigning to the above mentioned data. It needs to be explained that the above mentioned term "target storage space" refers to actual space assigned to the data. Such description is only used to distinguish different space referred to in the context for understanding, but may not intend to limit the technical solutions of the present disclosure. It needs to be understood that the above mentioned "available storage size" and "target storage space" is virtual storage space. The virtual storage space may corresponds to corresponding data, and then, the virtual storage space is mapped to actual physical space and address. However, in the context, in order to distinguish meanings, the virtual storage space is called as different names.

After the storage space is determined, corresponding space addresses may be assigned to the data. The space address may include the starting address and the offset, and the offset may be determined according to the size of the data,
where the process of assigning corresponding space addresses to the data may be the process of mapping the virtual storage space to the space address of the actual physical space. In the above, when assigning the target storage space to the data, the current available storage size may be looked up, and then the suitable part of storage space may be assigned to the data. In the process of assigning the storage space, a specific space address may not be assigned temporarily. This separation of space allocation and address allocation is apparently different from that in the prior art, in which the storage space and the space address are assigned to data at one time.

According to an embodiment of the present disclosure, a tree structure that comprises a plurality of nodes may be created, where each node represents one storage space, and a suitable node for storing data may be found by traversing the storage space. The "suitable node" here may be one node or a combination of the plurality of nodes.

It needs to be understood that forming the tree structure between memory blocks may be realized before the above mentioned step S210. In other words, the tree structure to be described later in detail may be formed in advance. The tree structure may be formed after the step S210 and before the step S220, which means forming the tree structure in real time through the space assigning request and the space releasing operation.

Figure 12:
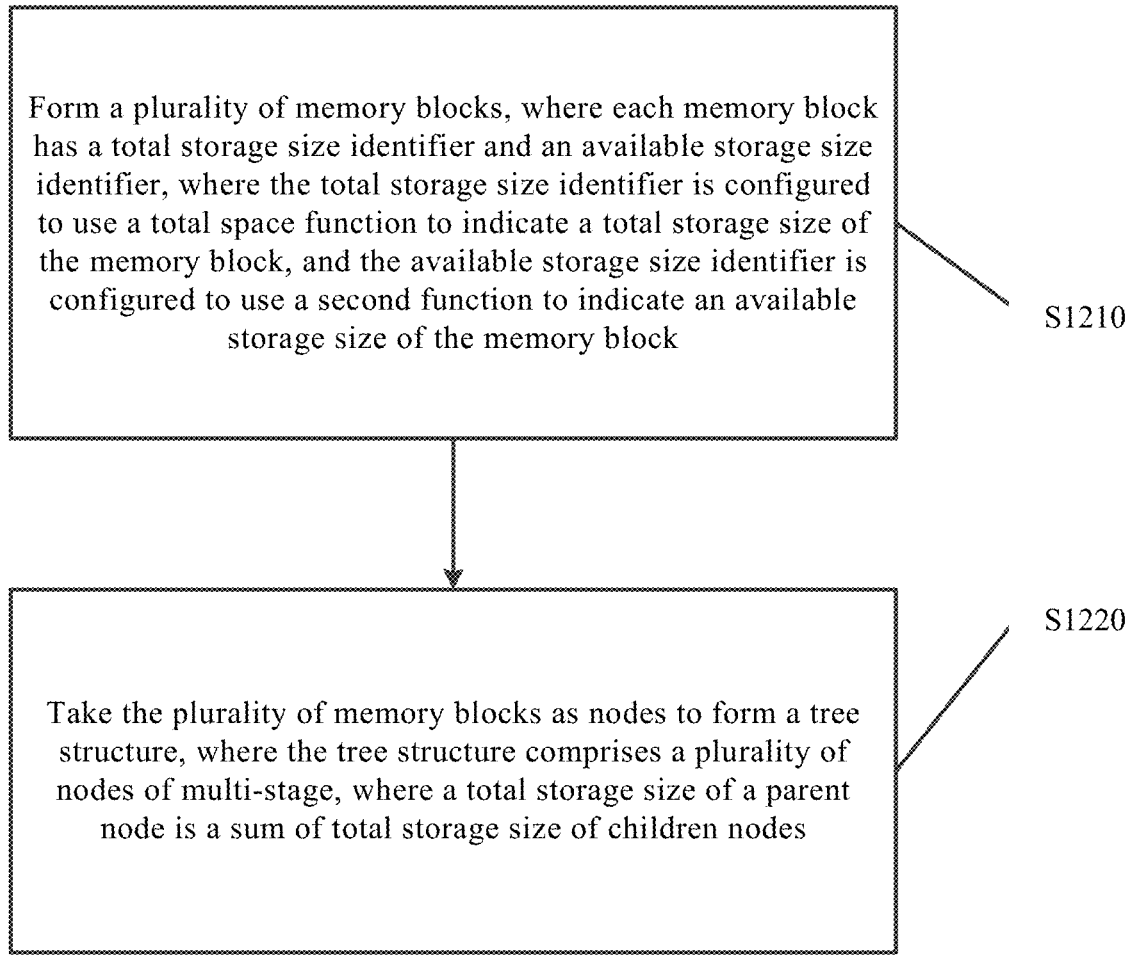
FIG. 12 is a flowchart of a method of forming a tree structure.

FIG. 12 is a flowchart of a method of forming the tree structure.

As shown in FIG. 12, methods of the present disclosure further include: at step S1210, forming a plurality of memory blocks, where each memory block has a total storage size identifier and an available storage size identifier, where the total storage size identifier is used to use a total space function to indicate total storage size of the memory block, and the available storage size identifier is used to use a second function to indicate available storage size of the memory block; and at step S1220, taking the plurality of memory blocks as nodes to form a tree structure, which comprises a plurality of nodes of multi-stage, where total storage size of a parent node is a sum of total storage size of children nodes.

Figure 13A:
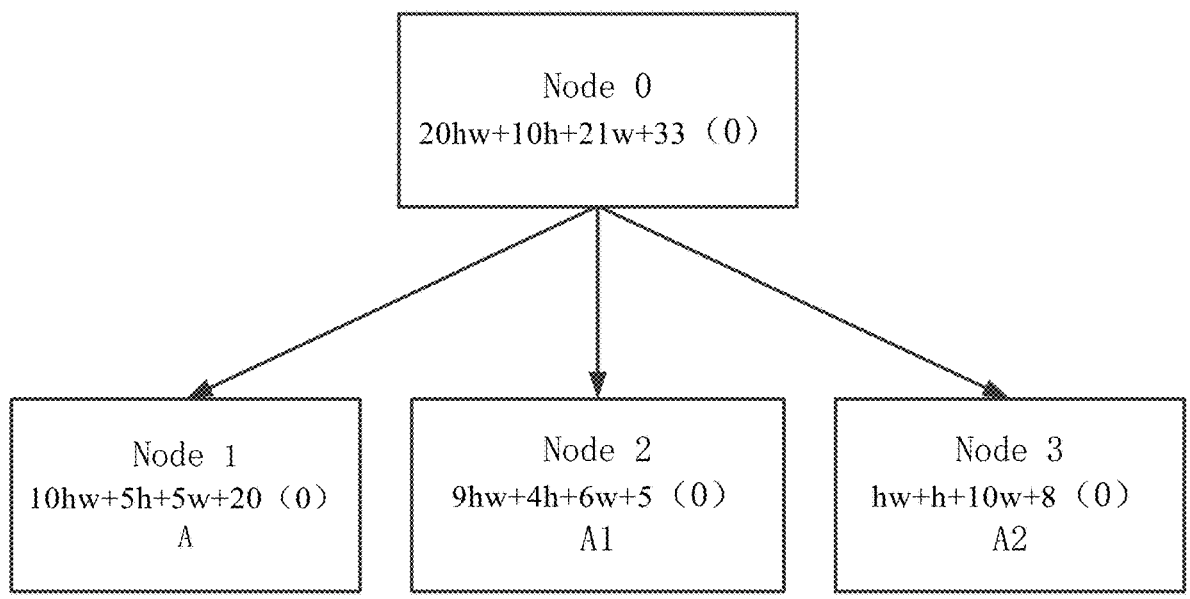
FIG. 13a to FIG. 13d are schematic diagrams of the tree structure according to an embodiment of the present disclosure.
Figure 13B:
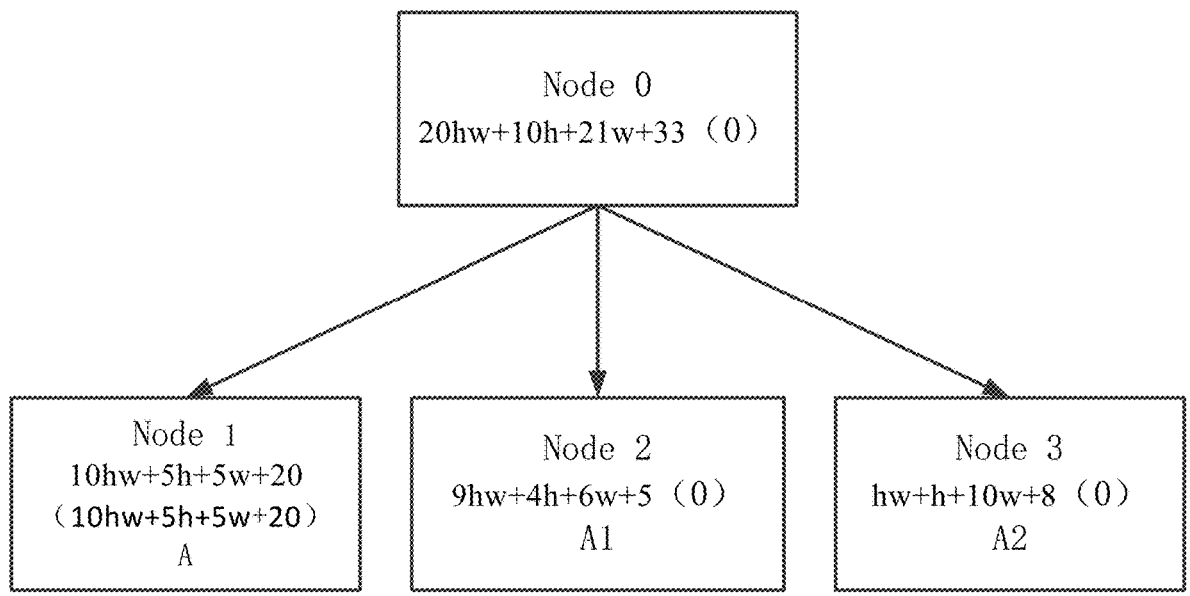
Figure 13C:
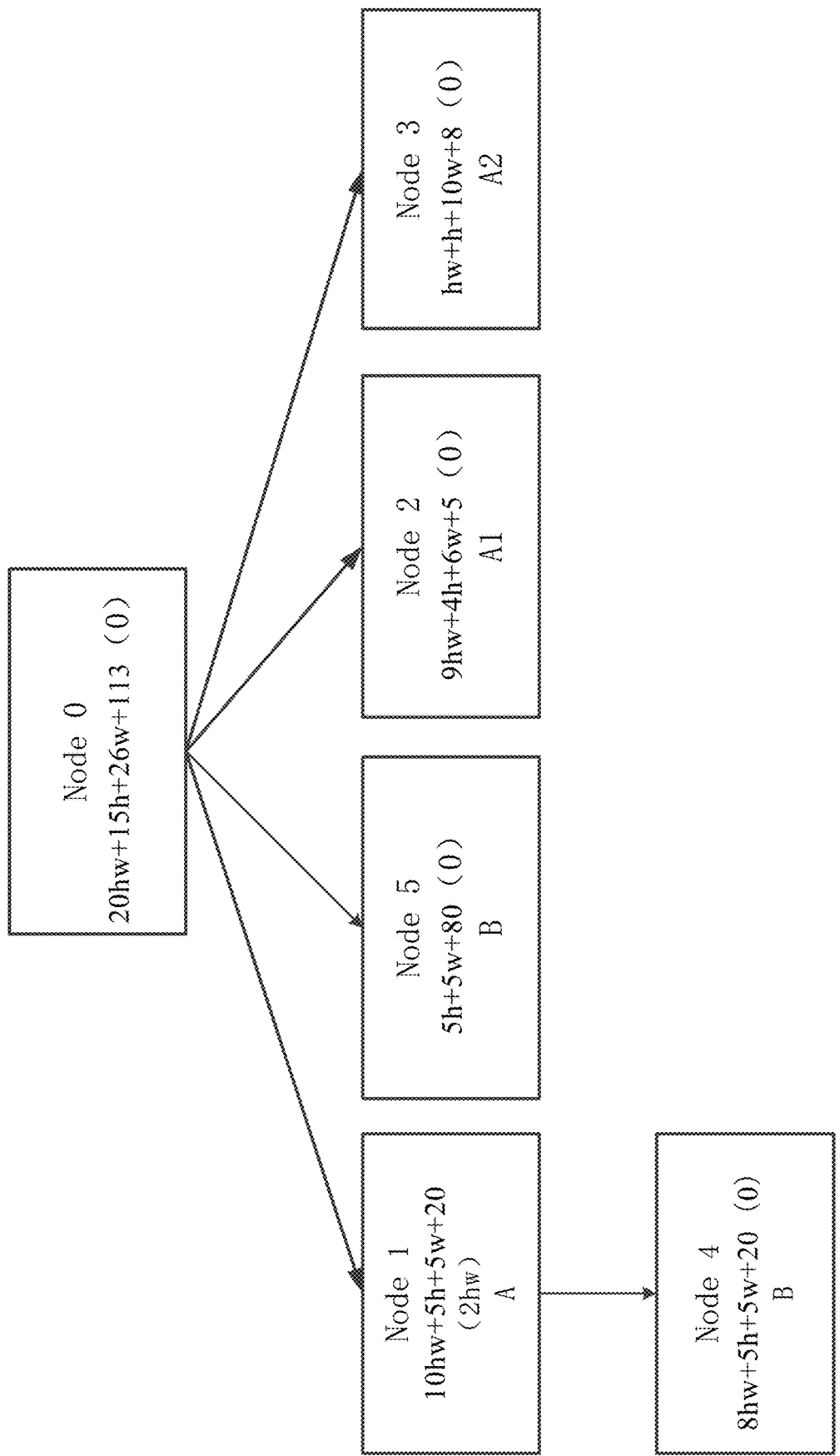

A process of forming the tree structure is described with combination of the above mentioned operation 1 to operation 8 and FIGS. 13a to 13c.

As shown in FIG. 13a, initialization may be performed first with assigning node 0 as an initialized node, where each node represents one memory block, the total storage size of the node 0 is 0, and the available storage size of the node 0 is 0; and for the convenience of description, a storage attribute of the node 0 may be represented as 0 (0).

Next, when receiving the instruction Alloc A 10hw+5h+5w+20 of the operation 1, a node 1 is created under the node 0 for storing the data A. Therefore, total storage size of the node 1 is 10hw+5h+5w+20, available storage size of the node 1 is 0, and a storage attribute of the node 1 may be represented as 10hw+5h+5w+20 (0).

When receiving the instruction alloc A1 9hw+4h+6w+5 of the operation 2, a node 2 is created under the node 0 for storing the data A1. Therefore, total storage size of the node 2 is 9hw+4h+6w+5, available storage size of the node 2 is 0, and a storage attribute of the node 2 may be represented as 9hw+4h+6w+5 (0).

When receiving the instruction alloc A2 hw+h+10w+8 of the operation 3, a node 3 under the node 0 is created for storing the data A2. Therefore, total storage size of the node 3 is hw+h+10w+8, available storage size of the node 3 is 0, and a storage attribute of the node 3 may be represented as hw+h+10w+8 (0).

At this time, the total storage size of the initialized node 0 is 20hw+10h+21w+33, the available storage size of the node 0 is 0, and a storage attribute of the node 0 may be represented as 20hw+10h+21w+33 (0).

It may be understandable that the storage space may be released. According to an embodiment of the present disclosure and in response to the received space releasing request, corresponding nodes may be released, and identifiers of the available storage size of the released nodes may be updated.

The following may take FIG. 13b as an example for description. When receiving the instruction dealloc A of the operation 4, the space of the node 1 is released. Therefore, the available storage size of the node 1 is 10hw+5h+5w+20, and the storage attribute of the node 1 may be represented as 10hw+5h+5w+20 (10hw+5h+5w+20) as shown in FIG. 13b. At this time, the total storage size of the initialized node 0 is 20hw+10h+21w+33, the available storage size of the node 0 is 0, and the storage attribute of the node 0 may be represented as 20hw+10h+21w+33 (0).

In the present disclosure, the released space may be used again to realize the purpose that the space is fully utilized. Therefore, according to an embodiment of the present disclosure, assigning the target storage space to the data according to the received space assigning request includes: traversing the available storage size in the nodes of the tree structure; and since the second function and the first function have a common function with available storage size, which is searched in the nodes of the tree structure, assigning the storage space indicated by the common function as the target storage space. "The second function searched in the nodes of the tree structure" may be the second function corresponds to a single node, or may be the "second function" formed by combination of more than one continuous nodes.

It needs to be understood that in a case that the size of the data is represented by the function, two functions having a common part includes the following cases:

in a first case, the first function and the second function have overlaps and cross sections, but the first function and the second function may not completely cover each other; in a second case, the first function completely covers the second function and is greater than the second function, which means the size of the data included in the space assigning request is completely greater than a size of the searched available storage size; in a third case, the second function completely covers the first function and is greater than the first function, which means the size of the data included in the space assigning request is completely greater than the size of the searched available storage size; and in a forth case, the first function is equal to the second function.

The following takes FIG. 13c as an example to describe the universality and complexity of the first case. For example, receiving the instruction alloc B 8hw+10h+10w+100 of the operation 5 represents asking for assigning storage space of 8hw+10h+10w+100 to the data B. At this time, only the node 1 has available storage size of 10hw+5h+5w+20; a function 10hw+5h+5w+20 of the available storage size has a common function 8hw+5h+5w+20 with a function 8hw+10h+10w+100 of the space to be assigned; and after the space of 8hw+5h+5w+20 is assigned to a common part of the data B, the available storage size of the node 1 is 2hw, and the data B still needs storage space of 5h+5w+80.

In this case, for the data B, the common part may be stored according to the method of 5h+5w+80, and another part, which is a non-common part in the space assigning request may be stored in a new created node (such as a node 5 shown in the FIG. 13c) by the 5h+5w+80. It needs to be understood that the common part of the data B may be directly stored in the storage space of 8hw+5h+5w+20 in the node 1, and such a method does not need to form new nodes. However, in the node 1, the storage space that is assigned to the data A before is assigned to the common part of the data B currently, so that correspondence between the node 1 and the data A may be eradicated, which is not benefit to the storage of subsequent storage relations.

According to an embodiment of the present disclosure, a new node 4 may be created in a next level of the node 1 to make total storage size of the new node equal to the above mentioned common function. Taking FIG. 13c as an example, a storage attribute of the new node 4 may be represented as 8hw+5h+5w+20 (0). At this time, the available storage size of the node 1 is 2hw, and the storage attribute of the node 1 may be represented as 10hw+5h+5w+20 (2hw). Besides, a total storage size identifier of the node 0 is changed to 20hw+15h+26W+113. As shown in FIG. 13c, the available storage size 2hw of the node 1 may be assigned to other data again. Therefore, according to an embodiment of the present disclosure, in a logical level, one node may only be assigned once to make sure that a same node corresponds to one piece of data. Therefore, the whole assigning process may be recorded completely, which is convenient for further splitting of children nodes. For example, the node 1 is assigned to the data A before, even though the space occupied by the data A is released, when new data (such as the data B) is required to occupy the space originally occupied by the data A, a new node (such as the node 4) is still required to be divided. However, in physical space, the newly created node 4 is still in the range of the physical space of the node 1.

Besides, it needs to be explained that the newly created node 5 is adjacent to the node 4 to make the data B be stored in continuous space. According to another embodiment of the present disclosure, the node 5 may in the left of the node 1, so that the node 5 is close to the node 4 and has continuous space. It needs to be understood that FIG. 13c is only an example, and a position of a newly created node may be adjusted according to real demands to make sure that a same piece of data may be stored in continuous space. This will be described in detail later. Besides, storing the same piece of data in the continuous space is only a preferable condition but not a mandatory requirement, which means the same data may be stored in discontinuous space.

Next, when performing the operation 6 "alloc C 4hw+20h+20w+50", the available storage size 2hw in the node 1 may be reused first, and then new space of 2hw+20h+20w+50 may be applied. Similarly, a new node may be created, and this new node has total storage size of 2hw+20h+20w+50.

Next, when performing the operation 7 "dealloc B", the space occupied by the data B is released, and the available storage pace is 8hw+10h+10w+100.

Next, when performing the operation 8 "alloc D 12hw+5h+5w+10", the space 8hw+5h+5w+10 may be reused, and another 4hw space is needed to be applied additionally.

Figure 13D:
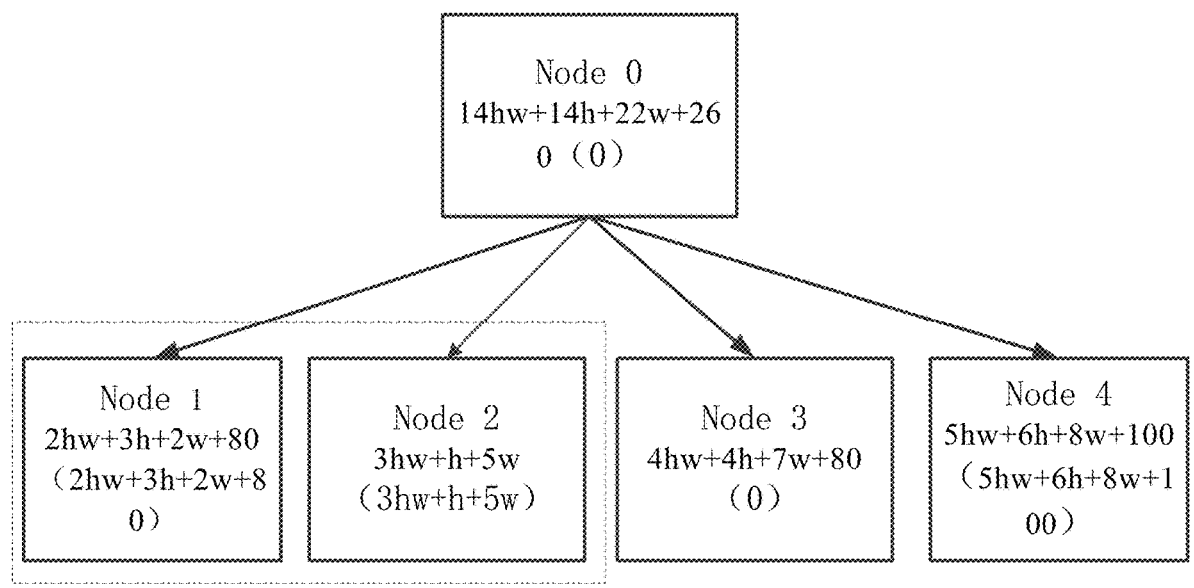

FIG. 13d is a schematic diagram of assigning the space to the data according to another embodiment of the present disclosure.

In FIG. 13d, the total storage size of the node 0 is 14hw+14h+22w+260, and the node 0 has four children nodes, which are the node 1 (2hw+3h+2w+80 (2hw+3h+2w+80)), the node 2 (3hw+h+5w (3hw+h+5w)), the node 3 (4hw+4h+7w+80 (0)), and the node 4 (5hw+6h+8W+100 (5hw+6h+8W+100)). At this time, the operation instruction alloc B1 4hw+4h+7w+80 is received. In the above mentioned four nodes, a sum of the available storage size of the node 1 and the node 2 is 5hw+4h+7w+80, which is bigger than the size of the data B1 and is enough to hold the data B1, and has a difference of hw with a function of the size of the data B1; the available storage size of the node 3 is 0, which is not enough to hold the data B1; and the available storage size of the node 4 is 5hw+6h+8W+100, which is bigger than the size of the data B1 and is enough to hold the data B1. In this case, many schemes may be used to store the data B1.

In a first scheme, the node 4 is used to allocate storage space of 4hw+4h+7w+80 to the data B1, so that after the allocation, the node 4 may have available storage size of hw+h+w+20.

In a second scheme, the available storage size of 2hw+3h+2w+80 of the node 1 is occupied, and then storage space of 2hw+h+5w is assigned from the node 2 or the node 4.

In a third scheme, available storage size of 3hw+h+5w of the node 2 is occupied, and then storage space of hw+3h+2w+80 is assigned from the node 1 or the node 4.

In a forth scheme, total storage size of 4hw+4h+7w+80 is assigned from the node 1, node 2 and node 4; for example, storage space of 2hw+2h+2w+40 may be assigned from the node 1, storage space of 2hw+h+5w may be assigned from the node 2, and storage space of h+40 may be assigned from the node 4.

Adopting the first scheme is benefit to make it easier for the newly assigned space to keep continuity in address, thereby decreasing hopping of addresses in the process of data access, and then increasing efficiency of the data access.

Adopting the second and the third scheme is benefit to decrease fragmentation of the space as much as possible. Besides, the method of assigning the storage space to the data by using the node 1 and the node 2 is also benefit to the data to be stored in continuous space, thereby decreasing hopping of addresses in the process of data access.

According to an embodiment of the present disclosure, since in the nodes of the tree structure, a single node with available storage size that may cover the data is not found, a new node is created to make sum of available storage size of the single node and the new node is not less than the size of the data.

The following may still take FIG. 13d as an example.

In a fifth scheme that the available storage size of the node 1 may not completely cover the data B1, the available storage size of $2hw+3h+2w+80$ in the node 1 may be assigned first, and then new storage space of $2hw+h+5w$ may be applied; therefore, total storage size is $4hw+4h+7w+80$, which is enough to hold the data B1.

In a sixth case that the available storage size of the node 2 may not completely cover the data B1, the available storage size of $3hw+h+w$ in the node 2 may be assigned first, and then new storage space of $hw+3h+2w+80$ may be applied; therefore, total storage size is $4hw+4h+7w+80$, which is enough to hold the data B1.

In the embodiment, the new node may form continuous space with the above mentioned single node.

Compared with the second and the third schemes, advantages of the fifth and the sixth schemes lie in that if the space in the node 1 and the node 2 is not continuous, space hopping in the data access process may easily lead to low efficiency, but the fifth and the sixth schemes may directly create new nodes to form continue space.

Figure 14:
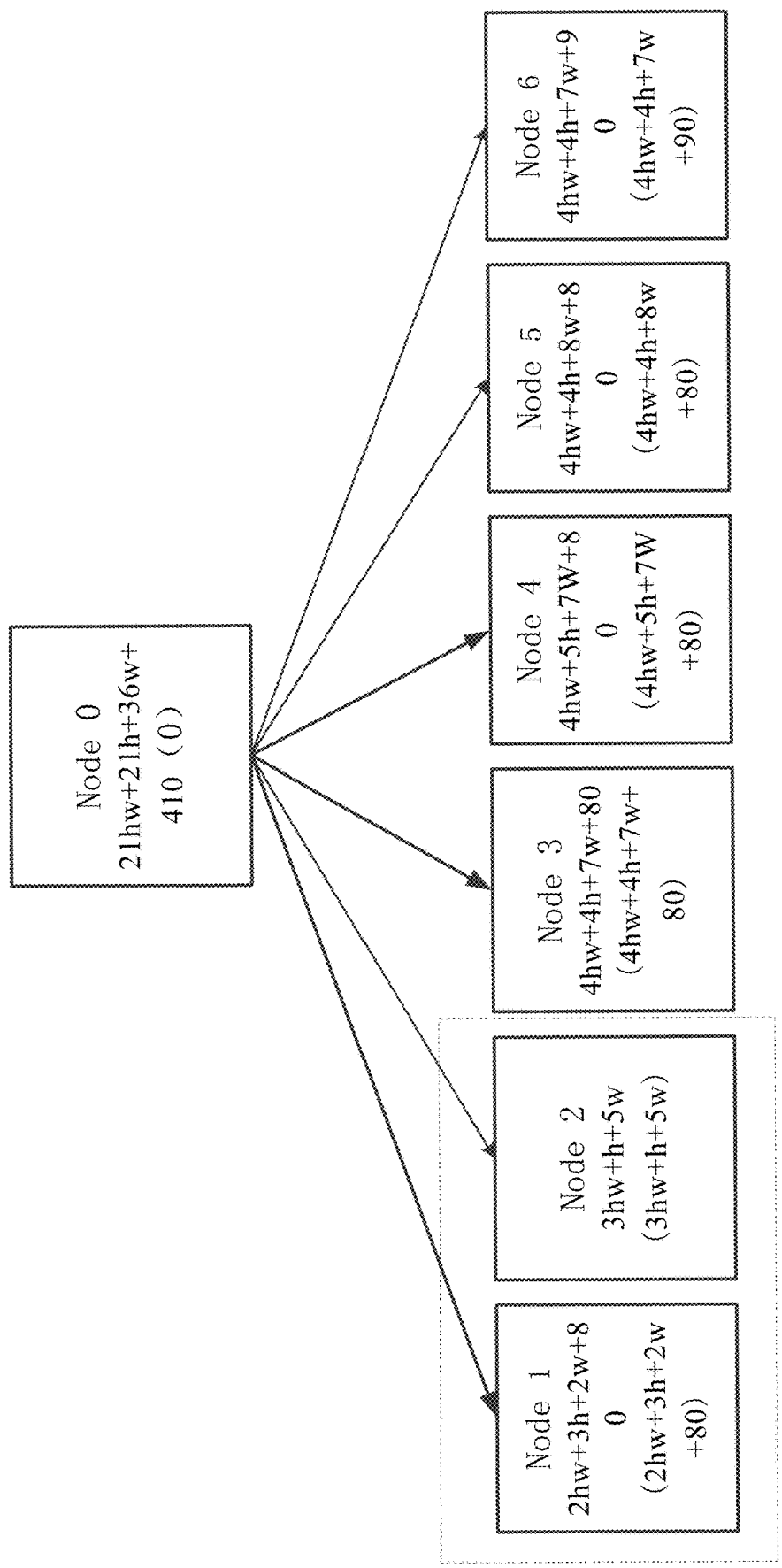
FIG. 14 is a schematic diagram of assigning target storage space to the data according to an embodiment in preferred embodiments of the present disclosure.

FIG. 14 is a schematic diagram of assigning the target storage space to the data according to an embodiment in the preferred embodiments of the present disclosure.

According to an embodiment of the present disclosure, since the second function and the first function have a common function with a largest available storage size, which is searched in the nodes of the tree structure, the storage space indicated by the common function is set as the target storage space.

As shown in FIG. 14, the node 0 has six children nodes, which are the node 1 ($2hw+3h+2w+80$ ($2hw+3h+2w+80$)), the node 2 ($3hw+h+5w$ ($3hw+h+5w$)), the node 3 ($4hw+4h+7w+80$ ($4hw+4h+7w+80$)), the node 4 ($4hw+5h+7W+80$ ($4hw+5h+7W+80$)), the node 5 ($4hw+4h+8w+80$ ($4hw+4h+8w+80$)) and the node 6 ($4hw+4h+7w+90$ ($4hw+4h+7w+90$)). At this time, the operation instruction alloc B1 $4hw+4h+7w+80$ is received. In the above mentioned six nodes, a sum of the available storage size of the node 1 and the node 2 is $5hw+4h+7w+80$, which is bigger than the size of the data B1 and is enough to hold the data B1, and has a difference of hw with a function of the size of the data B1; the available storage size of the node 3 is $4hw+4h+7w+80$, which is just enough to hold the data B1; the available storage size of the node 4 is $4hw+5h+7W+80$, which is bigger than the size of the data B1 and is enough to hold the data B1, and has a difference of h with the function of the size of the data B1; the available storage size of the node 5 is $4hw+4h+8W+80$, which is bigger than the size of the data B1 and is enough to hold the data B1, and has a difference of w with the function of the size of the data B1; and the available storage size of the node 6 is $4hw+4h+7W+90$, which is bigger than the size of the data B1 and is enough to hold the data B1, and has a difference of 10 with the function of the size of the data B1. According to an embodiment of the present disclosure, in a case that the node 3, the node 4, the node 5, the node 6 and a combination of the node 1 and the node 2 are all enough to hold the data B1, the node 3 may be chosen preferentially to hold the data B1, for the available storage size of the node 3 has a smallest difference with the size of the data B1. The above mentioned preferred embodiments are benefit to decrease fragmentation and increase utilization of the storage space.

Here, difference between a size of the available storage size and a size of to-be-assigned space is called as a cost function. The differences between the size of the data B1 and the combination of the node 1 and the node 2, the node 4, the node 5 and the node 6 are hw, h,w and 10, respectively. In such a case that the differences are not big, the following methods may be used to judge whether the first function and the second function have a maximum common function: first, choosing one node (such as the combination of the node 1 and the node 2, the node 4, the node 5 or the node 6) randomly to be the node assigned to the data; second, assigning a smallest node of the item of the difference between the second function and the first function as a node assigned to the data, for example, in the above mentioned four items, it is supposed that the second functions of the smallest h term and w term in the difference are nodes assigned to the data, the node 6 may be chosen to be assigned to the data. The assigning methods are flexible, so that those of ordinary skill in the art may set according to real demands.

According to an embodiment of the present disclosure, available storage size in the nodes of the tree structure is searched repeatedly until available storage size may not be found.

In this embodiment, when available storage size of a certain node is not enough to hold the size of the data in the space assigning request, all the nodes in the tree structure may be traversed to fully utilize all the space debris. For example, in the FIG. 13c, there is still 2hw available storage size in the node 1; therefore, if a size of data in subsequent space assigning request includes such an item as hw, the 2hw available storage size may still be reused. Certainly, if no available storage represented by a second function and has a common function with the first function is not found, a new node may be created.

The above introduced the process of creating the tree structure. There is another case that a sum of available storage size of all the existed nodes is not enough to hold the data, which means the first function completely covers the second function and is bigger than the second function; in other words, the size of the data included in the space assigning request is completely greater than the size of the searched available storage size. According to an embodiment of the present disclosure, assigning the target storage space to the data according to the received space assigning request includes: since available storage size that is not less than the size of the data is not found in the nodes of the tree structure, creating a new node so that the available storage size of the new node holds the data.

The following may introduce a plurality of embodiments of creating new nodes in detail.

Figure 15A:
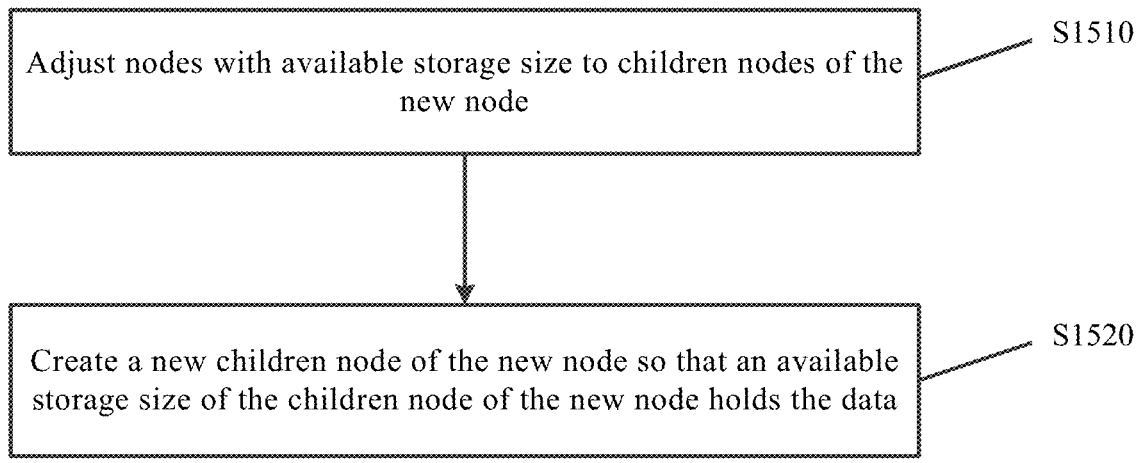
FIG. 15a is a flowchart of a method of creating new nodes according to an embodiment of the present disclosure.
Figure 15B:
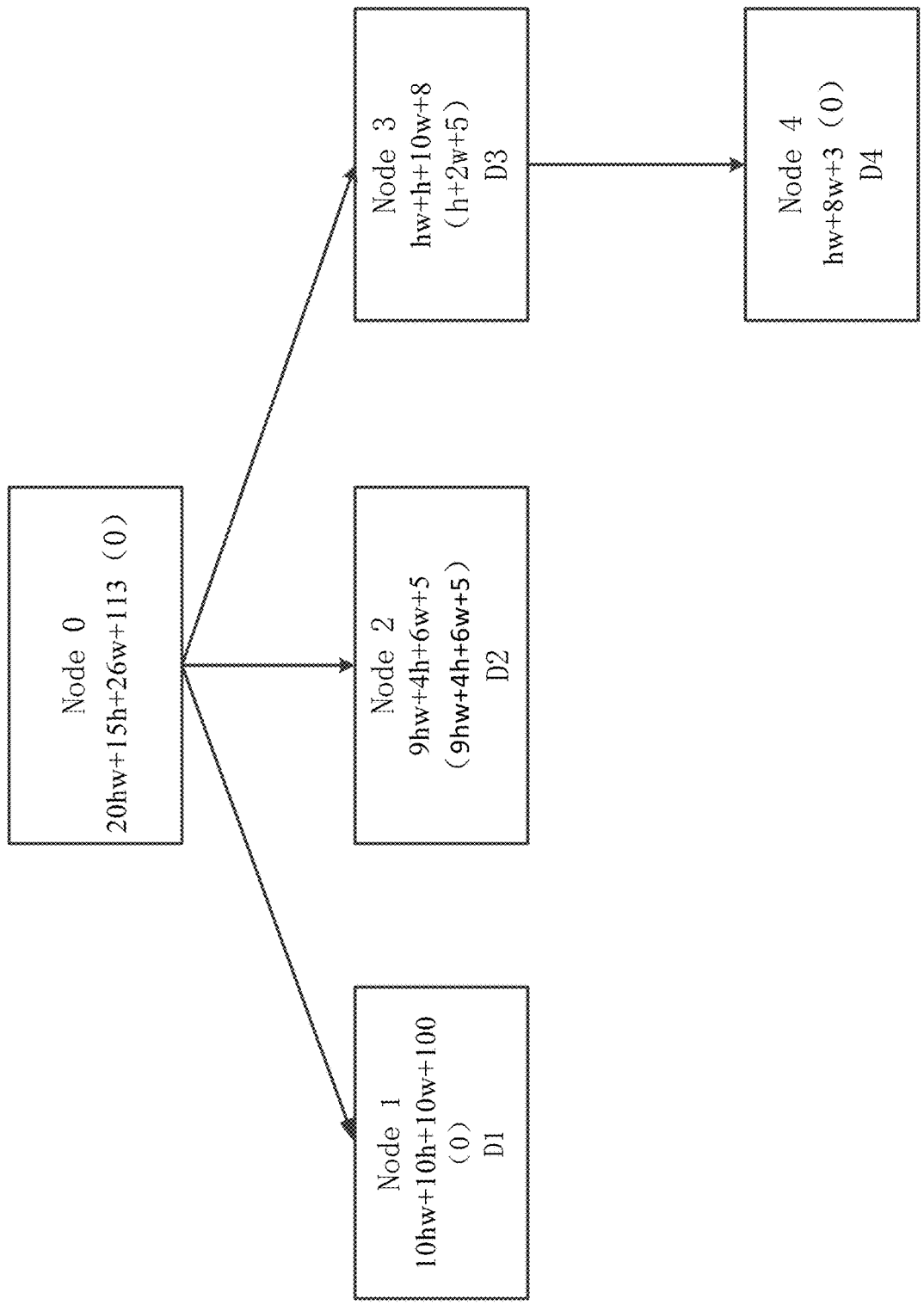
Figure 15C:
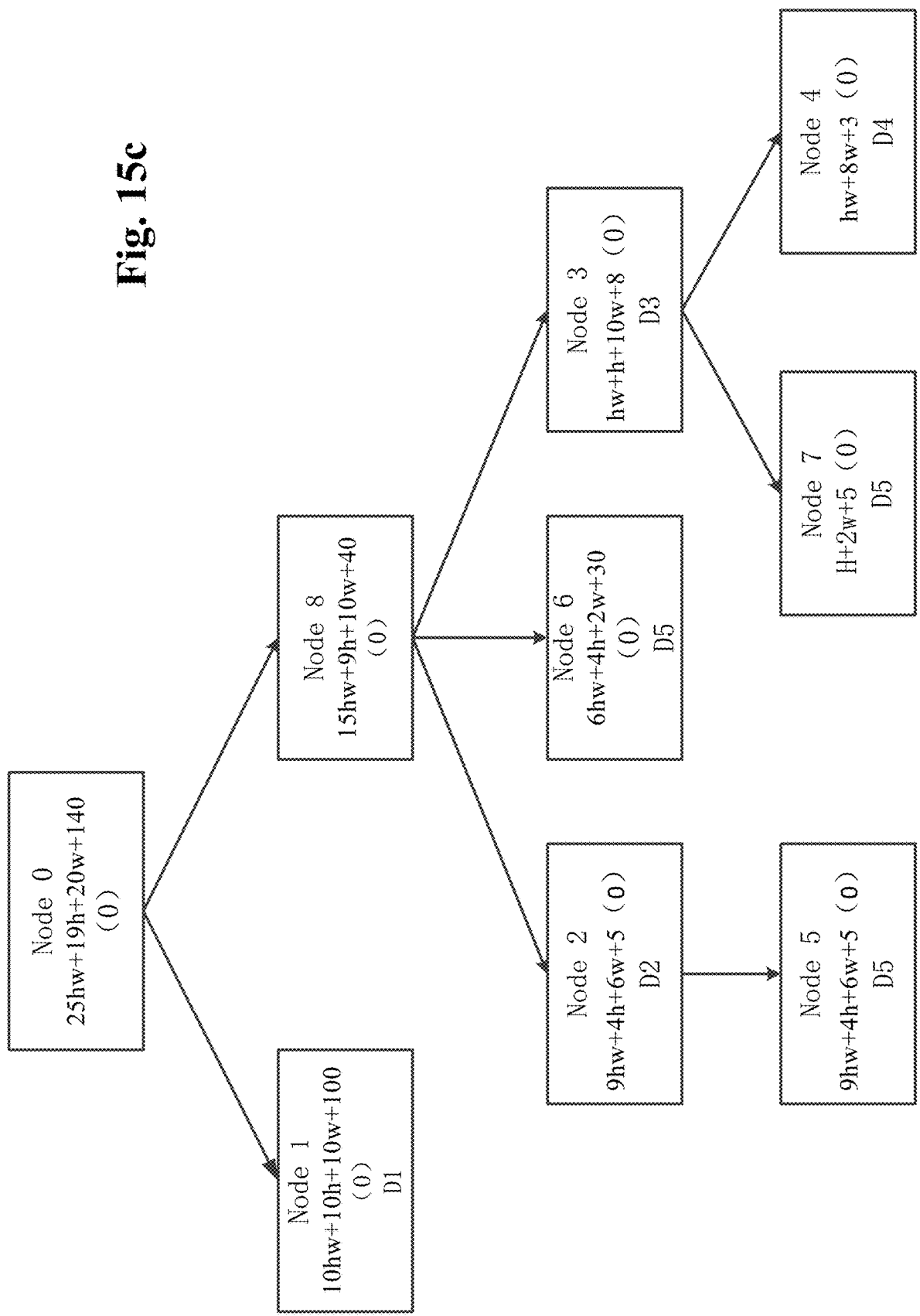

FIG. 15a is a flowchart of a method of creating the new node according to an embodiment of the present disclosure; and FIG. 15b and FIG. 15c are schematic diagrams of creating the new node according to the flowchart of the method shown in FIG. 15a.

As shown in FIG. 15a, creating the new node so that the available storage size of the new node holds the data includes: at step S1510, adjusting nodes with available storage size to children nodes of the new node; and at step S1520, creating a new children node of the new node so that an available storage size of the children node of the new node holds the data, where the nodes with the suable storage space are not enough to hold the data.

It is supposed that the current tree structure is as shown in FIG. 15b, where the total storage size of the node 0 is 20hw+15h+26w+113, and the node 1, the node 2 and the node 3 are children nodes of the node 0, where the total storage size of the node 1 is 10hw+10h+10w+100, and the available storage size of the node 1 is 0; the total storage size of the node 2 is 9hw+4h+6w+5, and the available storage size of the node 2 is 9hw+4h+6w+5; and the total storage size of the node 3 is hw+h+10w+8, and the available storage size of the node 3 is h+2w+5. The node 4 is the children node of the node 3, and the total storage size of the node 4 is hw+8w+3, and the available storage size of the node 4 is 0. Therefore, the total available storage size is 9hw+5h+8w+10, which is a sum of the available storage size of the node 2 and the available storage size of the node 3.

Supposing a space assigning request alloc D5 15hw+9h+10w+40 is received, the total available storage size 9hw+5h+8w+10 is smaller than the space asked by that space assigning request, so that a space of 6hw+4h+2w+30 is required. In such a case, new nodes are required to be created.

Therefore, as shown in FIG. 15c, a node 8 at the same level as node 1 is created, and the original node 2 and node 3 are moved to a next level of the new node 8 and set as children nodes of the new node 8. In such a case, a new children node 6 may be created, and the children node 6 has a total storage size identifier 6hw+5h+2w+30; therefore, the children node 2, the new children node 6 and the children node 3 have total available storage size of 15hw+9h+10w+40, so that the new node 8 may hold the data D5.

Further, the data D3 is stored in the children node 3 before, so that the children node 3 is required to be divided into a grand-children node 7 and a grand-children node 4, where the grand-children node 4 is a children node of the children node 3 before, and the grand-children node 7 is a newly created grand-children node.

Further, as mentioned before, in an embodiment, the same node may only be assigned to the same data. Therefore, the node 2 has available storage size of 9hw+4h+6w+5, but the node 2 is assigned to the data D2 before, so that a new node 5 may be created under the node 2 to be set as a children node of the node 2. It needs to be understood that the node 2 and the node 5 are the same node in the physical space of the memory, but are different nodes in the tree structure.

After the above mentioned creating process, the node 5 may provide storage space of 9hw+4h+6w+5, the node 6 may provide storage space of 6hw+4h+2w+30, and the node 7 may provide storage space of h+2w+5, so that the data D5 with the size of 15hw+9h+10w+40 may be holdd.

It may be seen from the above mentioned description for the FIG. 15b that the same data may occupy different nodes; for example, the data D5 may occupy the node 5, the node 6 and the node 7. However, the same node may only correspond to one piece of data; for example, the node 3 is assigned to the data D3 before, even though the space occupied by the data D3 is released, if the new data such as the data D4 and the data D5 need to occupy the space originally occupied by the data D3, the node 3 is still required to be further divided into the node 4 and the node 7. The above mentioned scheme is benefit to keep the whole correspondence between the nodes and the data.

According to an embodiment of the present disclosure, creating new nodes so that the available storage size holds the data may include: since an available storage size of all the nodes in the tree structure is 0, creating new nodes so that the available storage size of the new nodes holds the data.

In this embodiment, there is no available storage size in the existed nodes, so that a node of information may be fully created to store the data. The situation described in FIG. 13a is actually an implementation of this embodiment, which may not be repeated here.

According to another embodiment of the present disclosure, creating new nodes so that the available storage size holds the data may include: since there is no current available storage size that is not less than the size of the data searched in the nodes of the tree structure, and a size of data included in a next space assigning request is no larger than the current available storage size, creating new nodes so that the available storage size of the new nodes holds the data.

In this embodiment, timing of the space assigning request may be considered. For example, if existed available storage size is 6hw+4h+2w+30, and then a first space assigning request asks to allocate storage space of 15hw+9h+10w+40, then it should be considered whether required space of a second space assigning request after the first space assigning request is less than or equal to 6hw+4h+2w+30. If the required space is less than or equal to 6hw+4h+2w+30, a new node may be created first to be assigned to the first space assigning request, and the existing available storage size may be reserved to the second space assigning request. This embodiment is benefit to a periodical or a predictable space assigning request.

According to a method that creates new nodes in the FIG. 15c, nodes in the FIG. 13c may also be created according to the method of FIG. 15c.

Figure 16A:
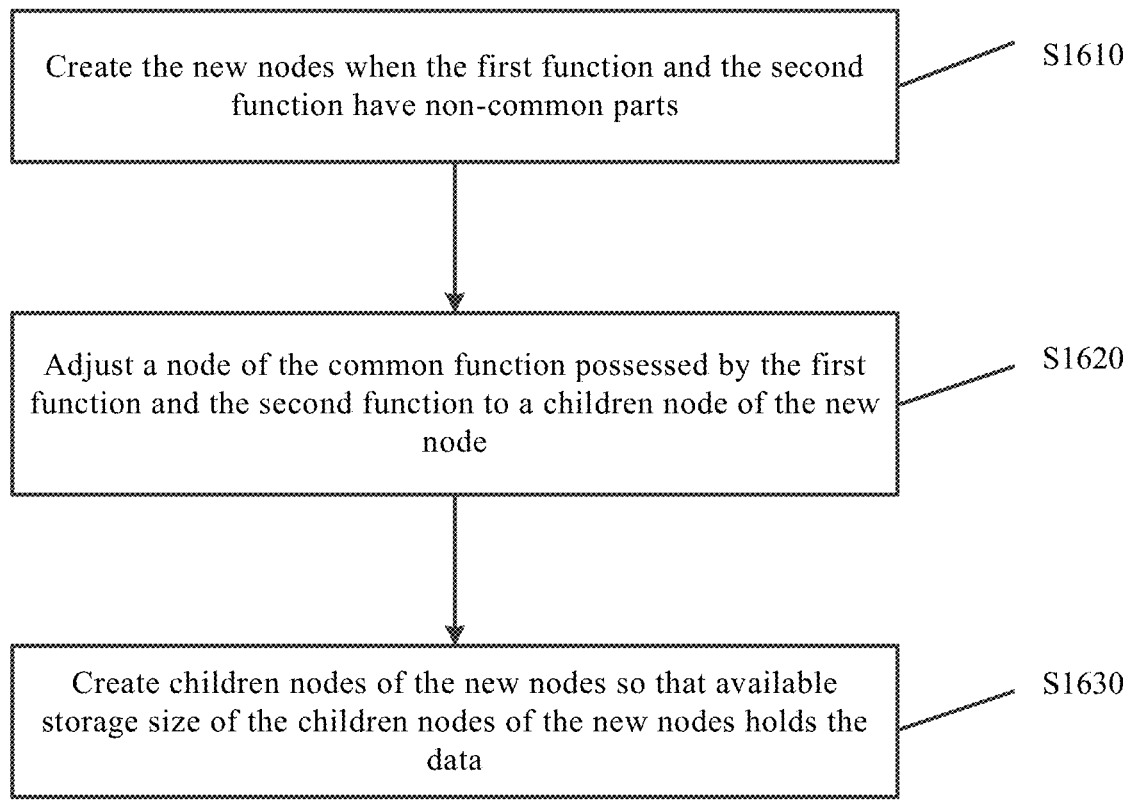
FIG. 16a is a flowchart of a method of creating the new nodes according to an embodiment of the present disclosure.
Figure 16B:
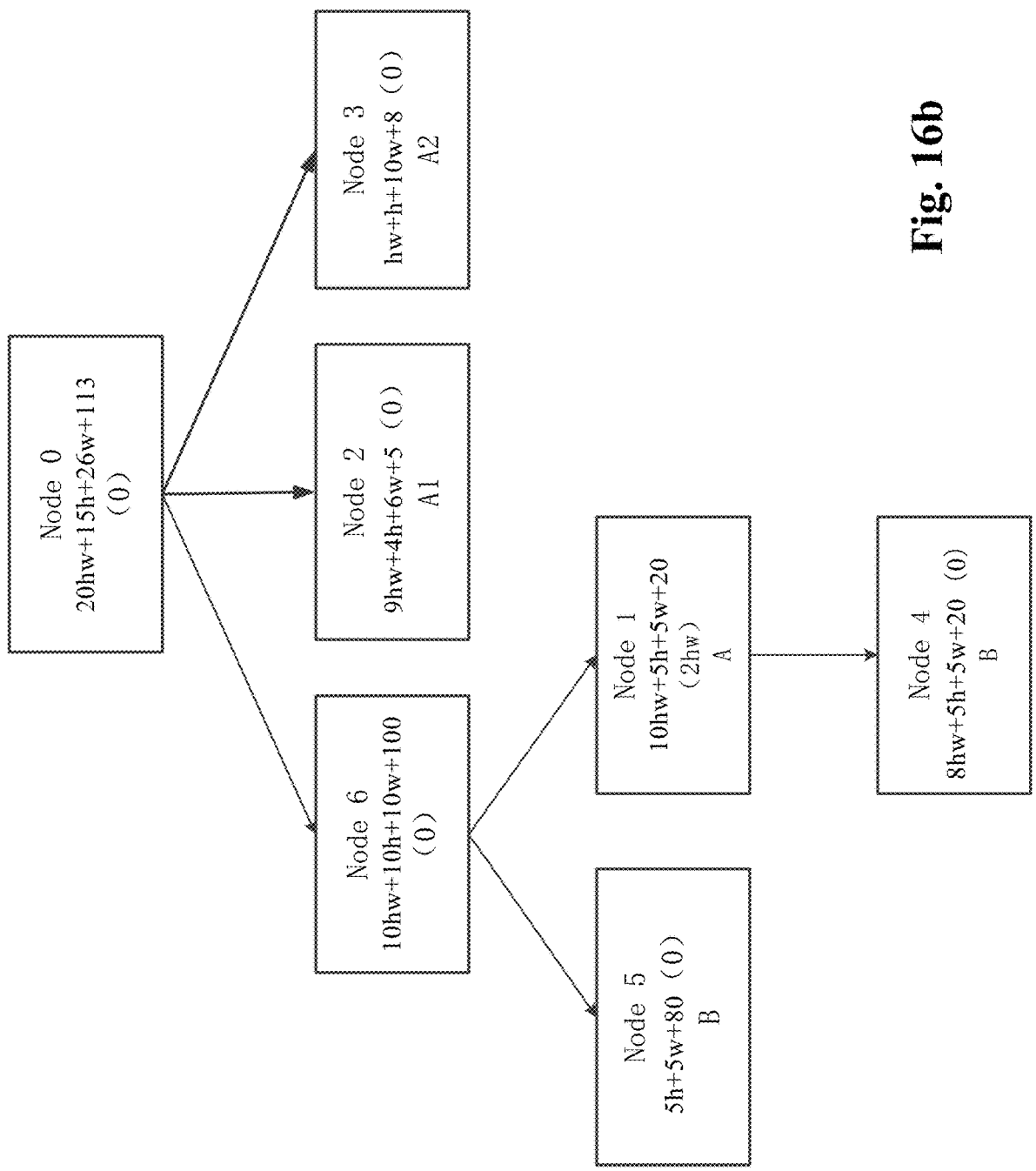
FIG. 16b is a flowchart of a method of creating the new nodes according to an embodiment of the present disclosure.

FIG. 16a is a flowchart of creating new nodes according to an embodiment of the present disclosure; FIG. 16b is a schematic diagram of creating new nodes according to another embodiment of the present disclosure; and FIG. 13c is another implementation.

As shown in FIG. 16a, creating the new nodes according to an embodiment of the present disclosure so that the available storage size holds the data includes: at step S1610, when the first function and the second function have non-common parts, creating the new nodes; at step S1620, adjusting a node of the common function possessed by the first function and the second function to a children node of the new node; and at step S1630, creating children nodes of the new nodes so that the available storage size of the children nodes of the new nodes holds the data.

In the above, the first function and the second function have non-common parts means that the first function and the second function have part overlaps and cross sections, but the first function and the second function may not completely cover each other, which has been introduced in the above. Total storage size of the new nodes is total area covered by the two functions. Specifically, total storage size of the new node is a sum of large items that make up the first function and the second function Taking a node 13b as an example, the second function represents the total storage size of the node 1 is 10hw+5h+5w+20, which has four items: 10hw, 5h, 5w and 20. In the space assigning request, the first function representing the size of the data is 8hw+10h+10w+100, which has four items: 8hw, 10h, 10w and 100; therefore, total storage size of a new node to be applied is 10hw+10h+10w+100; the total storage size of the new node subtracts the first function is the left available storage size (such as 2hw) of the node 1; and the total storage size of the new node subtracts the second function is a size of space (such as 5h+5w+80) of a new children node that needs to be re-applied for the data.

Therefore, as shown in FIG. 16b, a new node 6 may be created, which has total storage size of 10hw+10h+10w+100, and the node 6 is at the same level of the tree structure as the node 2 and the node 3; the node 1 is moved to be the children node of the node 6, where the total storage size of the node 1 is 10hw+5h+5w+20, and the available storage size of the node 1 is 2hw; a new node 5 is created to be the children node of the node 6, where the total storage size of the node 5 is 5h+5w+80, and the available storage size of the node 5 is 0; and the node 4 is still the children node of the node 1. In FIG. 16b, it needs to be understood that both the node 5 and the node 4 are configured to store the data B, so that in a preferable scheme, these two nodes are adjacent; therefore, the same data may be stored in continuous space, thereby decreasing frequent hopping in space addressing.

It may be understood that in a case that the nodes with available storage size in the tree structure are not enough to store data and new nodes are required to be created, storage space of children nodes of the new created nodes should be as smaller as possible, which may reuse the available storage size of the tree to a greatest degree, benefiting to decrease fragmentation of the space. Optionally, when the nodes with available storage size in the tree structure is not enough to store the data, the fifth and the sixth schemes described in combination with FIG. 13d are also applicable. In this case, new children nodes must be created. Similar to the fifth and the sixth schemes, a new created node may be chosen to hold a part of the data, and then children nodes of the new created nodes may be created to hold a left part of the data. The children nodes of the new created nodes may form continuous space with the nodes that have available storage size, thereby decreasing the space hopping in the process of data access.

After the tree structure is formed and a new space assigning request is received, the tree structure may be traversed to find expected available storage size. According to an embodiment of the present disclosure, when traversing the tree structure, a depth first scheme may be adopted; and the depth first scheme means that after traversing a parent node and all children nodes of this parent node, traversing another node that lies at the same level with the above mentioned parent node.

For example, in FIG. 15c, when receiving a space assigning request, the node 1 is required to be searched first; and when there is no enough available storage size searched in the node 1, the node 8 needs to be searched, and then the node 2, the node 5, the node 6, the node 3, the node 7 and the node 4 need to be searched. The depth first scheme is benefit to store the same data in continuous space, thereby decreasing hopping of space addressing in a computation process.

Another embodiment of the present disclosure further includes adjusting positions of the nodes to make space of the plurality of memory blocks be continuous.

It needs to be understood that the nodes correspond to virtual storage space, so that making the same data be stored in the continuous space may decrease the hopping of space addressing in the computation process, and then improving computation efficiency.

As shown in FIG. 15c, the node 6 used to store the data D5 is inserted between the node 2 and the node 3, and the node 7 is closed created by the node 6; therefore, the data D5 may be continuously stored in continuous space closely to the node 5, the node 6 and the node 7. The node 6 may also be set after the node 3, and the node 7 may be set after the node 4, but such a method tends to cause space hopping easily.

Therefore, to keep continuity of the space, an embodiment of the present disclosure further includes fixing order of the nodes in the tree structure.

The method of fixing the order of the nodes may be realized by marking the parent node of the nodes. For example, as shown in FIG. 15c, a mark "ordered" may be made on the node 8, and then the order of all children nodes under the node 8 may be fixed. For another example, the mark "ordered" may be made on the node 3, and then the order of the node 7 and the node 4 under the node 3 may be fixed.

Fixing the order of the nodes is benefit to store the same piece of data in the continuous space, thereby decreasing the hopping of space addressing.

Different from the prior art, in the above mentioned process, only the storage space is assigned, and addresses are not assigned to the data, which means that the space assigning and the address assigning are separated; however, in the prior art, the space and the address are assigned at one time, which is a difference between technical solutions of the present disclosure and technical solutions of the prior art.

Figure 17:
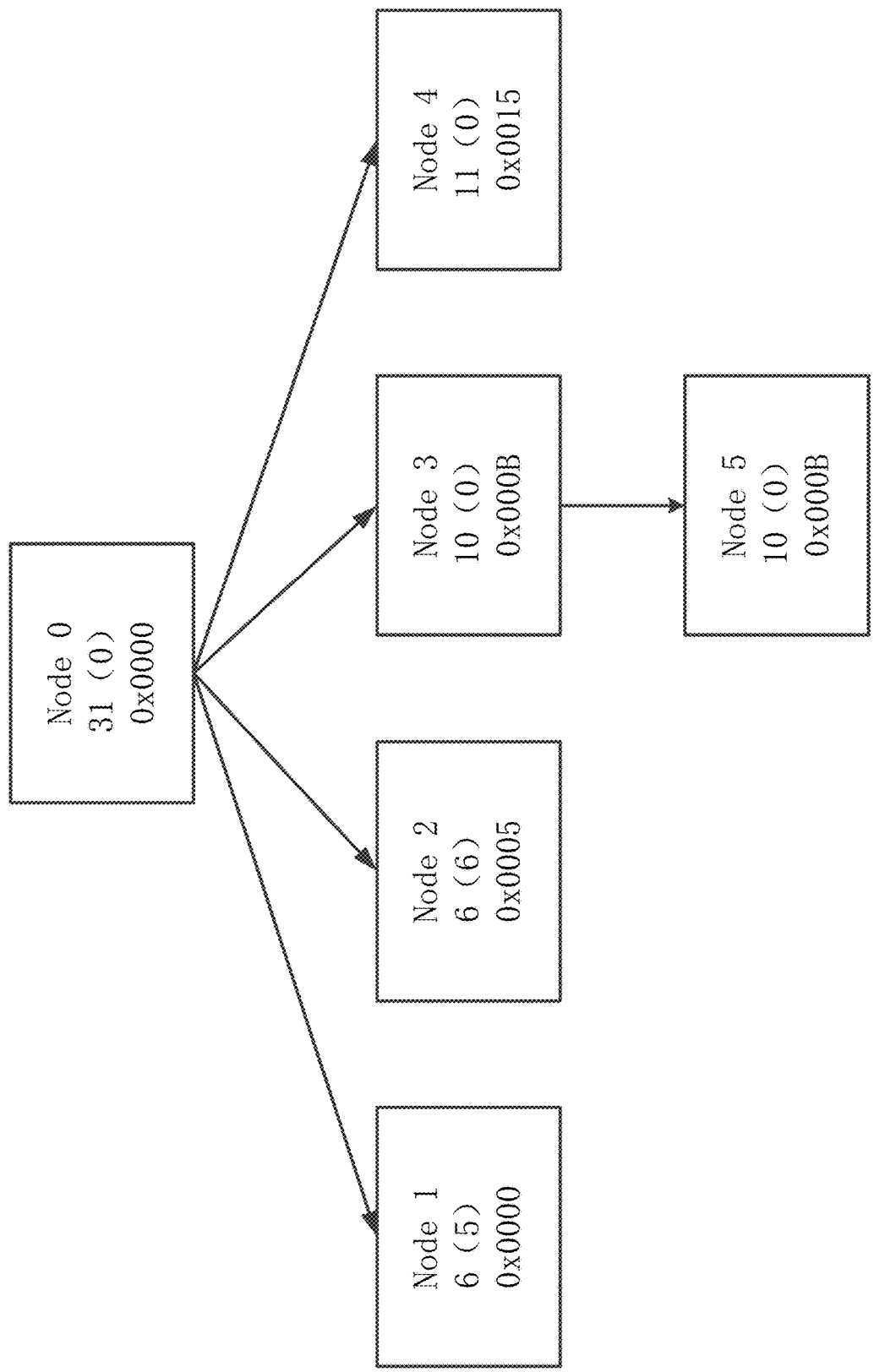
FIG. 17 is a schematic diagram of assigning an address to the storage space according to an embodiment of the present disclosure.

FIG. 17 is a schematic diagram of assigning the address to the storage space according to an embodiment of the present disclosure. For easier understanding, a size of total storage size of each node in the FIG. 17 is represented by a specific number.

The tree structure shown in FIG. 17 includes a node 0, a node 1, a node 2, a node 3, a node 4 and a node 5. The node 0 is the root node with total storage size of 31 bits and available storage size of 0 bits, and a storage attribute of the node 0 is represented as 31 (0); the node 1, the node 2, the node 3 and the node 4 are children nodes of the node 0, and their storage attributes are respectively represented as 5 (5), 6 (6), 10 (0) and 11 (0); and the node 5 is a children node of the node 3, and the storage attribute is represented as 10 (0).

A width-first scheme is adopted when assigning addresses to these nodes, which means assigning addresses to the nodes at the same level, and then specifically assigning addresses to children nodes of each node.

As shown in FIG. 17, a starting address of the node 0 is 0x0000 with an offset of 31; and as a first children node of the node 0, a starting address of the node 1 may also be 0x0000 with an offset of 5, so that an ending address of the node 1 is 0x0004. Similarly, a starting address of the node 2 may be 0x0005 with an offset of 6; a starting address of the node 3 may be 0x000B with an offset of 10; a starting address of the node 4 may be 0x0015 with an offset of 11; and as a children node of the node 3, a starting address of the node 5 may be 0x000B with an offset of 10.

If the above mentioned specific number is represented by a function, supposing the size of the total storage size of the node 0 is 20hw+15h+26w+113, and the starting address of the node 0 is 0x0000, an address range of the node 0 is 0x0000+(20hw+15h+26w+113)−1.

It may be seen that from the above mentioned arrangement that the space of the same data may be kept continuous, so that continuous addresses may also be assigned, thereby greatly improving space utilization in the memory, and decreasing fragmentation. Besides, through technical solutions of the present disclosure, continuity of data storage may be kept, thus avoiding hopping of addressing and improving speed of data throughput; and another benefit is that since all node information is kept, all records of data storage in the process of space assigning and releasing are kept, which is convenient for reserving of records of subsequent data tracking and storing.

The technical solutions of the present disclosure is especially suitable for a memory with a relatively large storage capacity, such as an off-chip memory and a hard disk.

Figure 18:
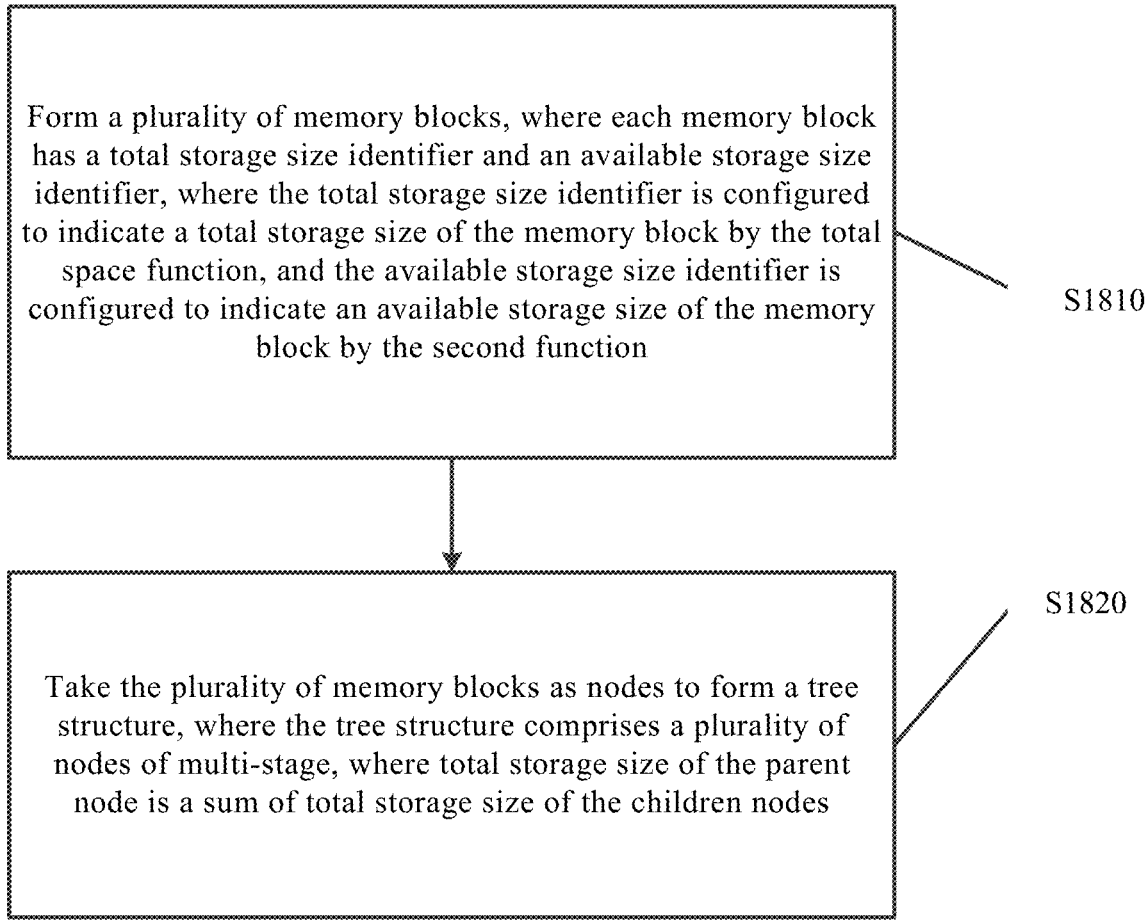
FIG. 18 is a method of managing the storage space according to an embodiment of the present disclosure.

FIG. 18 shows a method of managing the storage space according to an embodiment of the present disclosure, including: at step S1810, forming a plurality of memory blocks, where each memory block has a total storage size identifier and an available storage size identifier, where the total storage size identifier is used to indicate total storage size of the memory block, and the available storage size identifier is used to indicate available storage size of the memory block; and at step S1820, taking the plurality of memory blocks as nodes to form a tree structure, which comprises a plurality of nodes of multi-stage, where total storage size of the parent node is a sum of total storage size of the children nodes.

Figure 19:
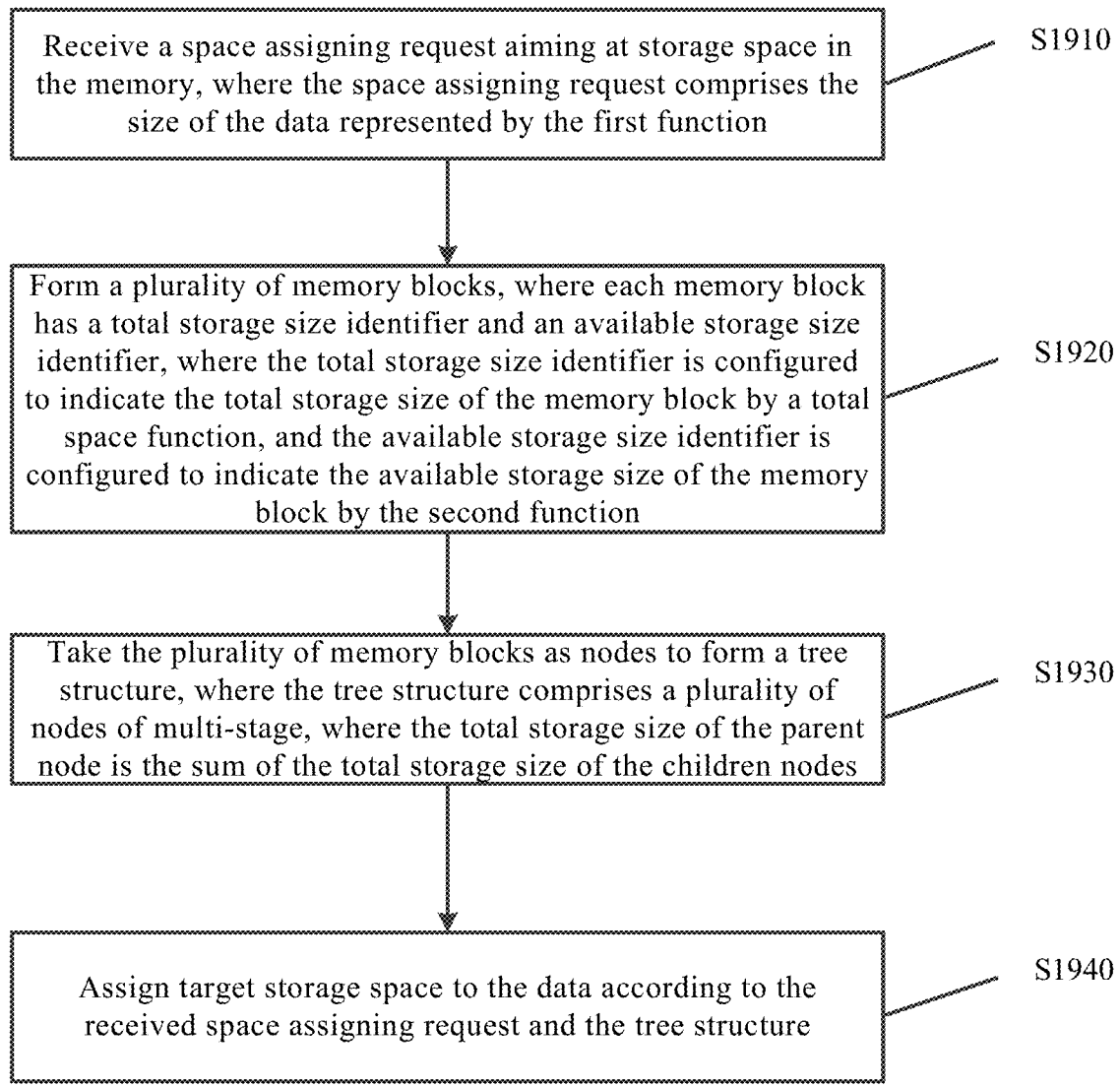
FIG. 19 is a method of assigning the storage space to data in the memory according to an embodiment of the present disclosure.

FIG. 19 is a method of assigning the storage space to the data in the memory according to an embodiment of the present disclosure, including: at step S1910, receiving a space assigning request aiming at storage space in the memory, where the space assigning request comprises the size of the data represented by the first function; at step S1920, forming a plurality of memory blocks, where each memory block has a total storage size identifier and an available storage size identifier, where the total storage size identifier is used to indicate the total storage size of the memory block by a total space function, and the available storage size identifier is used to indicate the available storage size of the memory block by the second function; at step S1930, taking the plurality of memory blocks as nodes to form a tree structure, which comprises a plurality of nodes of multi-stage, where the total storage size of the parent node is the sum of the total storage size of the children nodes; and at step S1940, according to the received space assigning request and the tree structure, assigning target storage space to the data.

Specific implementation of each operation in the above mentioned FIG. 18 and FIG. 9 is explained in detail according to FIG. 11 to FIG. 17, and may not be repeated here.

The present disclosure also provides an electronic device, including: one or a plurality of processors; and a memory, where the memory stores a computer executable instruction, and when the computer executable instruction is executed by the one or the plurality of processors, the electronic may perform the above mentioned method.

The present disclosure also provides a computer-readable storage medium, on which the computer executable instruction is stored. The above mentioned method may be implemented when the computer executable instruction is executed by the one or the plurality of processors.

Technical solutions of the present disclosure may be applied to an artificial intelligence field and implemented in a host or a server, or implemented into or realized in the artificial intelligence chip. The chip may exist independently or be contained in a computation apparatus.

Figure 20:
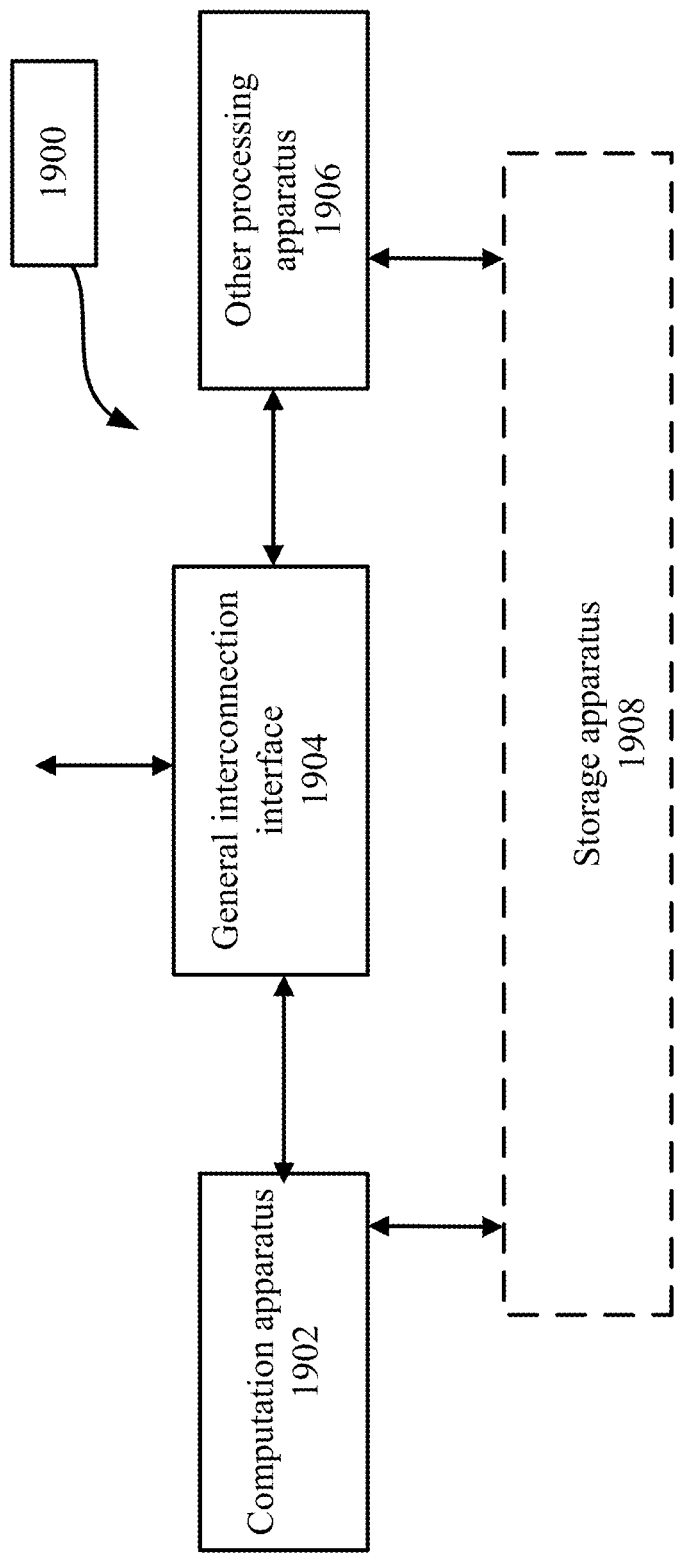
FIG. 20 is a schematic block diagram of a combined processing apparatus.

FIG. 20 shows a combined processing apparatus 1900, which includes the above-mentioned computation apparatus 1902, a general interconnection interface 1904, and other processing apparatus 1906. According to the present disclosure, the computation apparatus interacts with other processing apparatuses to jointly complete an operation specified by the user. FIG. 20 is a schematic diagram of the combined processing apparatus.

Other processing apparatuses include one or more types of general-purpose/special-purpose processors such as a central processing unit (CPU), a graphics processing unit (GPU), a neural network processor, and the like. A count of processors included in other processing apparatuses is not limited. Other processing apparatuses may serve as interfaces that connect a machine learning computation apparatus to external data and control including data moving, and may perform basic controls such as starting and stopping the machine learning computation apparatus; and other processing apparatuses may also cooperate with the machine learning computation apparatus to complete computation tasks.

A general interconnection interface is configured to transfer data and a control instruction between the computation apparatus (such as a machine learning computation apparatus) and other processing apparatuses. The computation apparatus obtains required input data from other processing apparatuses and write the data in an on-chip storage apparatus of the computation apparatus; the computation apparatus may obtain a control instruction from other processing apparatuses, and write the control instruction in an on-chip control cache of the computation apparatus; and the computation apparatus may further read data stored in a storage unit of the computation apparatus and transfer the data to other processing apparatuses.

Alternatively, the structure may also include a storage apparatus 1908. The storage apparatus 1908 is connected to the computation apparatus and other processing apparatuses respectively. The storage apparatus is configured to store data of the computation apparatus and other processing apparatuses, and is especially suitable for storing data that may not be fully stored in the internal memory of the computation apparatus or other processing apparatuses.

The combined processing apparatus may be used as an SOC (system on chip) of a device including a mobile phone, a robot, a drone, a video surveillance device, and the like, thereby effectively reducing the core area of a control section, increasing the processing speed, and decreasing the total power consumption. In this case, the general interconnection interface of the combined processing apparatus may be connected to some components of the device. The components include, for example, a webcam, a monitor, a mouse, a keyboard, a network card, and a WIFI interface.

Figure 21:
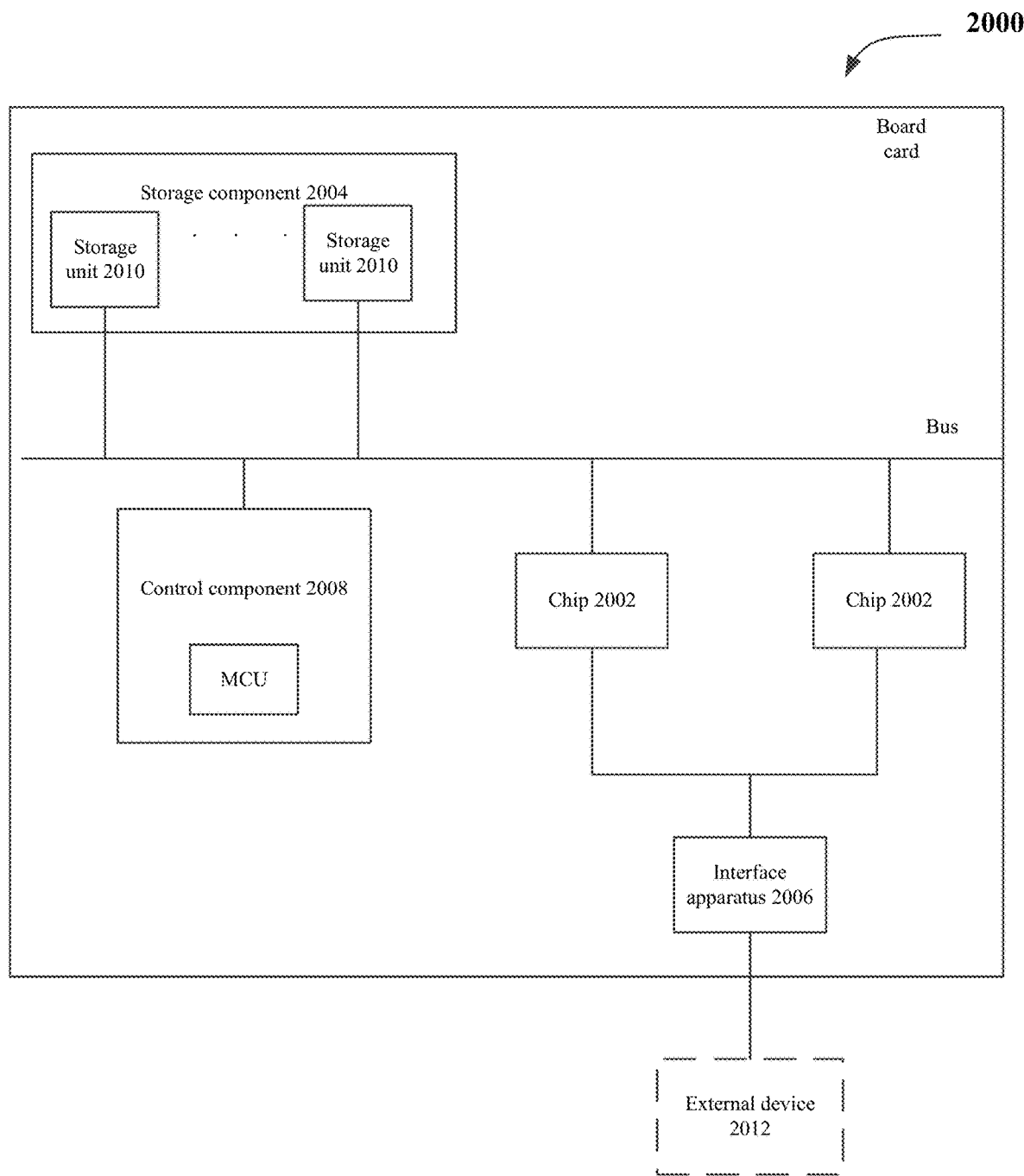
FIG. 21 is an exemplary block diagram of a board card.

In some embodiments, the present disclosure also discloses a board card, which includes the above chip package structure. FIG. 21 provides an exemplary board card, which not only includes the above mentioned chip 2002, but also includes other supporting components. Other supporting components include but are not limited to a storage component 2004, an interface apparatus 2006, and a control component 2008.

The storage component is connected to the chip in the chip package structure through a bus, and the storage component is configured to store data. The storage component may include a plurality of groups of storage units 2010. Each group of the storage units is connected to the chip through a bus. It may be understood that each group of the storage unit may be a DDR SDRAM (double data rate synchronous dynamic random-access memory).

The DDR may double the speed of the SDRAM without increasing the clock frequency. The DDR allows data to be read on a rising and a falling edge of the clock pulse. The speed of the DDR is twice the speed of a standard SDRAM. In an embodiment, the storage apparatus may include 4 groups of storage units. Each group of the storage unit may include a plurality of DDR4 particles (chips). In an embodiment, four 72-bit DDR4 controllers may be arranged inside the chip, where 64 bits of each 72-bit DDR4 controller are for data transfer and 8 bits are for ECC (error checking and correcting) parity. In an embodiment, each group of the storage units includes a plurality of DDR SDRAMs arranged in parallel. DDR may transfer data twice in one clock cycle. A controller for controlling the DDR is arranged in the chip to control data transfer and data storage of each storage unit.

The interface apparatus may be electrically connected to the chip inside the chip package structure. The interface apparatus is configured to implement data transfer between the chip and an external device 2012 (such as a server or a computer). For example, in an embodiment, the interface apparatus may be a standard PCIe (peripheral component interconnect express) interface. For instance, data to be processed may be transferred by a server through the standard PCIe interface to the chip to realize data transfer. In another embodiment, the interface apparatus may also be other interfaces. The present disclosure does not limit a specific form of expression of other interfaces as long as the interface unit may realize a transferring function. In addition, a computation result of the chip is still sent back to the external device (such as a server) by the interface apparatus.

The control component is electrically connected to the chip. The control component is configured to monitor a state of the chip. Specifically, the chip and the control component may be electrically connected through an SPI (serial peripheral interface). The control component may include an MCU (micro controller unit). For example, the chip may include a plurality of processing chips, a plurality of processing cores, or a plurality of processing circuits, and may drive a plurality of loads. Therefore, the chip may in different working states such as multi-load working states and light-load working states. The control apparatus may realize regulation of working states of a plurality of processing chips, a plurality of processing cores and/or a plurality of processing circuits in the chip.

In some embodiments, the present disclosure discloses an electronic device or apparatus, which includes the above mentioned board card.

The electronic device or apparatus includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle includes an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

It should be noted that the above mentioned embodiments, for the sake of conciseness, are all described as a series of action combinations, but those skilled in the art should know that the present disclosure is not limited by the described order of action since some steps may be performed in a different order or simultaneously according to the present disclosure. Secondly, those skilled in the art should also understand that the embodiments described in the specification are all optional, and the actions and units involved are not necessarily required for the present disclosure.

In the above-mentioned embodiments, description of each embodiment has its own emphasis. For parts that are not described in detail in an embodiment, reference may be made to related descriptions of other embodiments.

In some embodiments of the present disclosure, it should be understood that the disclosed apparatus may be implemented through other manners. The apparatus embodiments described above are merely illustrative, for example, the division of the unit is only a division of a logical function. In a real implementation, there may be other manners for division. For example, a plurality of units or components may be combined or may be integrated into another system, or some features may be ignored or not performed. In addition, coupling or direct coupling or communication connection between each illustrated or discussed component may be indirect coupling or communication connection through some interfaces, apparatuses or units, and may be in the form of electrical, optical, acoustic, magnetic, and the like.

The units described as separate components may or may not be physically separated. The components shown as units may or may not be physical units. In other words, the components may be located in one place, or may be distributed into a plurality of network units. According to certain needs, some or all of the units may be selected for implementing the purposes of the schemes of the embodiments.

In addition, each functional unit in every embodiment of the present disclosure may be integrated into one processing unit, or each unit may be physically stand alone, or two or more units may be integrated into one unit. The integrated unit above may be implemented in the form of hardware or in the form of software program unit.

When the integrated unit is implemented in the form of a software program unit and sold or used as an independent product, the integrated unit may be stored in a computer-readable memory. Based on such understanding, the technical solutions of the present disclosure may be embodied in the form of a software product that is stored in a memory. The computer software product includes several instructions to enable a computer device (which may be a personal computer, a server, or a network device, and the like) to perform all or part of the steps of the methods described in each embodiment of the present disclosure. The foregoing memory includes: a USB flash drive, a ROM (read-only memory), a RAM (random-access memory), a mobile hard disk, a magnetic disk, or an optical disc, and other media that may store program codes.

The embodiments of the present disclosure are described in detail before. Specific examples are used in the specification to explain the principles and embodiments of the present disclosure. The descriptions of the above embodiments are only used to facilitate understanding of the methods and core ideas of the present disclosure. In addition, persons of ordinary skill in the art may change the implementation and application scope according to the ideas of the present disclosure. In summary, the content of this specification should not be construed as a limitation on the present disclosure.

The foregoing contents may be better understood according to the following articles:

Article A1. A method of allocating a space address to data in a memory, comprising:
  receiving a space assigning request aiming at storage space in the memory, wherein the space assigning request comprises a size of the data;
  assigning target storage space to the data according to the received space assigning request; and allocating the space address to the data based on the assigned target storage space.

Article A2, the method of article A1, further comprising:
forming a plurality of memory blocks, wherein each memory block has a total storage size identifier and an available storage size identifier, wherein the total storage size identifier is configured to indicate total storage size of the memory block, and the available storage size identifier is configured to indicate available storage size of the memory block; and taking the plurality of memory blocks as nodes to form a tree structure, wherein the tree structure comprises a plurality of nodes of multi-stage, wherein the total storage size of a parent node is a sum of total storage size of children nodes.

Article A3. The method of article A2, wherein assigning the target storage space to the data according to the received space assigning request comprises:
traversing an available storage size in the nodes of the tree structure; and
assigning the target storage space to the data according to the received space assigning request when the available storage size of the nodes that is greater than or equal to the size of the data is found in the tree structure.

Article A4. The method of article A3, further comprising: assigning the target storage space to the data according to the received space assigning request when the available storage size of the nodes with a smallest difference with the size of the data is found in the nodes of the tree structure.

Article A5. The method of article A3, wherein assigning the target storage space to the data according to the received space assigning request comprises: creating a new node when the available storage size of nodes that is greater than or equal to the size of the data is not found in the tree structure, so that the available storage size of the new node holds the data.

Article A6. The method of article A5, wherein creating the new node so that the available storage size of the new node holds the data comprises:
adjusting a node with the available storage size to be the children node of the new node; then
creating a new children node of the new node so that an available storage size of the children node of the new node holds the data; or
creating the new node so that the available storage size of the new node holds the data comprises:
creating the new node so that the available storage size of the new node holds the data when an available storage size of all the nodes in the tree structure is 0; or
creating the new node so that the available storage size of the new node holds the data comprises:
creating the new node so that the available storage size of the new node holds the data, when a current available storage size of the nodes that is greater than or equal to the size of the data is not found in the tree structure, and a size of data included in a next space assigning request is no larger than a size of the current available storage size.

Article A7. The method of any one of article A3 to article A6, wherein traversing available storage size of the nodes in the tree structure comprises: traversing another node at the same level as a parent node after traversing the parent node and all children nodes of the parent node.

Article A8. The method of any one of the article A2 to A7 further comprises: adjusting a position of the node to make space of the plurality of memory blocks be continuous.

Article A9. The method of any one of articles A2 to A8 further comprises: fixing an order of the nodes in the tree structure.

Article A10, the method of articles A2 to A9, further comprising:
releasing a corresponding node in response to a received space releasing request; and
updating an available storage size identifier of the released node.

Article A11. The method of any one of the articles A2 to A10, wherein allocating the space address to the data based on the assigned target storage space comprises: assigning addresses to other nodes at the same level orderly after allocating the space address to one node, wherein the address of each node covers addresses of all children nodes of the node.

Article A12. A method of managing storage space comprises:
forming a plurality of memory blocks, wherein each memory block has a total storage size identifier and an available storage size identifier, wherein the total storage size identifier is configured to indicate total storage size of the memory block, and the available storage size identifier is configured to indicate available storage size of the memory block; and
taking the plurality of memory blocks as nodes to form a tree structure, wherein the tree structure comprises a plurality of nodes of multi-stage, wherein the total storage size of a parent node is a sum of total storage size of children nodes.

Article A13. A method of assigning storage space to data in a memory, comprising:
receiving a space assigning request aiming at the storage space in the memory, wherein the space assigning request comprises a size of the data;
forming a plurality of memory blocks, wherein each memory block has a total storage size identifier and an available storage size identifier, wherein the total storage size identifier is configured to indicate total storage size of the memory block, and the available storage size identifier is configured to indicate available storage size of the memory block;
taking the plurality of memory blocks as nodes to form a tree structure, wherein the tree structure comprises a plurality of nodes of multi-stage, wherein total storage size of a parent node is a sum of total storage size of children nodes; and
assigning target storage space to the data according to the received space assigning request and the tree structure.

Article A14, the method of article A12 to A13, further comprising:
traversing the available storage size in the nodes of the tree structure in response to the received space assigning request for assigning the target storage space to the data; and
assigning the target storage space to the data according to the received space assigning request when the available storage size of the nodes that is greater than or equal to the size of the data is found in the tree structure.

Article A15. The method of article A14, further comprising: assigning the target storage space to the data according to the received space assigning request when the available storage size of the nodes with a smallest difference with the size of the data is found in the tree structure.

Article A16. The method of article A14, further comprising: creating a new node when the available storage size of nodes that is greater than or equal to the size of the data is not found in the tree structure, so that the available storage size of the new node holds the data.

Article A17. The method of article A16, wherein creating the new node so that the available storage size of the new node holds the data comprises:
adjusting a node with the available storage size to be the children node of the new node; then
creating a new children node of the new node so that the available storage size of the new node holds the data; or
creating the new node so that the available storage size of the new node holds the data comprises:
creating the new node so that the available storage size of the new node holds the data when an available storage size of all the nodes in the tree structure is 0; or
creating the new node so that the available storage size of the new node holds the data comprises:
creating the new node so that the available storage size of the new node holds the data, when a current available storage size of the nodes that is greater than or equal to the size of the data is not found in the tree structure, and a size of data included in a next space assigning request is no larger than a size of the current available storage size.

Article A18. The method of any one of article A14 to article A17, wherein traversing the available storage size in the nodes of the tree structure comprises: traversing another node at the same level as a parent node after traversing the parent node and all children nodes of the parent node.

Article A19. The method of any one of the articles A12 to A18 further comprises: adjusting a position of the node to make space of the plurality of memory blocks be continuous.

Article A20. The method of any one of articles A12 to A19 further comprises: fixing an order of the nodes in the tree structure.

Article A21. An electronic device, comprising:
one or a plurality of processors; and
a memory, wherein the memory stores a computer executable instruction, and when the computer executable instruction is operated by one or a plurality of processors, the electronic device performs the method of any one of articles A1 to A20.

Article A22. A computer-readable storage medium, comprising a computer executable instruction, wherein the method of any one of articles A1 to A20 is implemented when the computer executable instruction is operated by one or a plurality of processors.

Article B1. A method of allocating a space address to data in a memory, comprising:
receiving a space assigning request aiming at storage space in the memory, wherein the space assigning request comprises a size of the data represented by a first function;
assigning target storage space to the data according to the received space assigning request; and
allocating the space address to the data based on the assigned target storage space.

Article B2, the method of article B1, further comprising:
forming a plurality of memory blocks, wherein each memory block has a total storage size identifier and an available storage size identifier, wherein the total storage size identifier is configured to indicate total storage size of the memory block by a total space function, and the available storage size identifier is configured to indicate available storage size of the memory block by a second function; and
taking the plurality of memory blocks as nodes to form a tree structure, wherein the tree structure comprises a plurality of nodes of multi-stage, wherein the total storage size of a parent node is a sum of total storage size of children nodes.

Article B3. The method of article B2, wherein assigning the target storage space to the data according to the received space assigning request comprises:
traversing an available storage size in the nodes of the tree structure; and
assigning the storage space indicated by a common function as the target storage space when the available storage size of nodes represented by the second function is found in the tree structure, wherein the second function and the first function have the common function.

Article B4. The method of article B3, further comprising: assigning the storage space indicated by a maximum common function as the target storage space when the available storage size of nodes represented by the second function is found in the tree structure, wherein the second function and the first function have the maximum common function.

Article B5. The method of article B3, further comprising: traversing the available storage size of the nodes in the tree structure repeatedly until no available storage size is found.

Article B6. The method of article B3, wherein assigning the target storage space to the data according to the received space assigning request comprises: creating a new node so that the available storage size of the new node holds the data when the available storage size of the nodes that is greater than or equal to the size of the data is not found in the tree structure.

Article B7. The method of article B6, wherein creating the new node so that the available storage size of the new node holds the data comprises:
adjusting a node with the available storage size to be the children node of the new node;
creating a new children node of the new node so that an available storage size of the children node of the new node holds the data; or
creating the new node so that the available storage size of the new node holds the data comprises:
creating the new node so that the available storage size of the new node holds the data when an available storage size of all the nodes in the tree structure is 0; or
creating the new node so that the available storage size of the new node holds the data comprises:
creating the new node so that the available storage size of the new node holds the data, when a current available storage size of the nodes that is greater than or equal to the size of the data is not found in the tree structure, and a size of data included in a next space assigning request is no larger than a size of the current available storage size.

Article B8. The method of article B6, wherein creating the new node so that the available storage size of the new node holds the data comprises:
creating a new node since the first function and the second function have non-common parts;
adjusting a node of the common function possessed by the first function and the second function to be a children node of the new node; and
creating a new children node of the new node so that an available storage size of the children node of the new node holds the data.

Article B9. The method of any one of article B3 to article B8, wherein traversing the available storage size in the nodes of the tree structure comprises: traversing another node at the same level as the parent node after traversing the parent node and all children nodes of the parent node.

Article B10. The method of any one of the articles B2 to B9 further comprises: adjusting a position of the node to make space of the plurality of memory blocks be continuous.

Article B11. The method of any one of articles B2 to B10 further comprises: fixing an order of the nodes in the tree structure.

Article B12, the method of any one of articles B2 to B11, further comprising:
  releasing a corresponding node in response to a received space releasing request; and
  updating an available storage size identifier of the released node.

Article B13. The method of any one of the articles B2 to B12, wherein allocating the space address to the data based on the assigned target storage space comprises: assigning addresses to other nodes at the same level orderly after allocating the space address to one node, wherein the address of each node covers addresses of all children nodes of the node.

Article B14. A method of managing storage space comprises:
  forming a plurality of memory blocks, wherein each memory block has a total storage size identifier and an available storage size identifier, wherein the total storage size identifier is configured to indicate total storage size of the memory block by a total space function, and the available storage size identifier is configured to indicate available storage size of the memory block by a second function; and
  taking the plurality of memory blocks as nodes to form a tree structure, wherein the tree structure comprises a plurality of nodes of multi-stage, wherein the total storage size of a parent node is a sum of total storage size of children nodes.

Article B15. A method of assigning storage space to data in a memory, comprising:
  receiving a space assigning request aiming at the storage space in the memory, wherein the space assigning request comprises a size of the data represented by a first function;
  forming a plurality of memory blocks, wherein each memory block has a total storage size identifier and an available storage size identifier, wherein the total storage size identifier is configured to indicate total storage size of the memory block by a total space function, and the available storage size identifier is configured to indicate available storage size of the memory block by a second function;
  taking the plurality of memory blocks as nodes to form a tree structure, wherein the tree structure comprises a plurality of nodes of multi-stage, wherein the total storage size of a parent node is a sum of total storage size of children nodes; and
  assigning target storage space to the data according to the received space assigning request and the tree structure.

Article B16, the method of article B14 to B15, further comprising:
  traversing the available storage size in the nodes of the tree structure in response to the received space assigning request for assigning the target storage space to the data; and
  assigning the storage space indicated by a common function as the target storage space when the available storage size of nodes represented by the second function is found in the tree structure, wherein the second function and the first function have the common function.

Article B17. The method of article B16, further comprising: assigning the storage space indicated by a maximum common function as the target storage space when the available storage size of nodes represented by the second function is found in the tree structure, wherein the second function and the first function have the maximum common function.

Article B18. The method of article B16, further comprising: traversing the available storage size of the nodes in the tree structure repeatedly until no available storage size is found.

Article B19. The method of article B16, further comprising: creating a new node so that the available storage size of the new node holds the data when the available storage size of the nodes that is greater than or equal to the size of the data is not found in the tree structure.

Article B20. The method of article B19, wherein creating the new node so that the available storage size of the new node holds the data comprises:
  adjusting a node with the available storage size to be the children node of the new node;
  creating a new children node of the new node so that an available storage size of the children node of the new node holds the data; or
  creating the new node so that the available storage size of the new node holds the data comprises:
  creating the new node so that the available storage size of the new node holds the data when an available storage size of all the nodes in the tree structure is 0; or
  creating the new node so that the available storage size of the new node holds the data comprises:
  creating the new node so that the available storage size of the new node holds the data, when a current available storage size of the nodes that is greater than or equal to the size of the data is not found in the tree structure, and a size of data included in a next space assigning request is no larger than a size of the current available storage size.

Article B21. The method of any one of article B16 to article B20, wherein traversing the available storage size in the nodes of the tree structure comprises: traversing another node at the same level as a parent node after traversing the parent node and all children nodes of the parent node.

Article B22. The method of any one of the articles B14 to B21 further comprises: adjusting a position of the node to make space of the plurality of memory blocks be continuous.

Article B23. The method of any one of articles B14 to B22 further comprises: fixing an order of the nodes in the tree structure.

Article B24. An electronic device, comprising:
  one or a plurality of processors; and
  a memory, wherein the memory stores a computer executable instruction, and when the computer executable instruction is operated by the one or the plurality of processors, the electronic device performs the method of any one of articles B1 to B23.

Article B25. A computer-readable storage medium, comprising a computer executable instruction, wherein the method of any one of articles B1 to B23 is implemented when the computer executable instruction is operated by one or a plurality of processors.

What is claimed:

1. A method of allocating a space address to data in a memory, comprising:
    receiving a space assigning request aiming at storage space in the memory, wherein the space assigning request comprises a size of the data;
    assigning target storage space to the data according to the received space assigning request;
    allocating the space address to the data based on the assigned target storage space;
    forming a plurality of memory blocks, wherein each memory block has a total storage size identifier and an available storage size identifier, wherein the total storage size identifier is configured to indicate a total storage size of the memory block, and the available storage size identifier is configured to indicate an available storage size of the memory block; and
    taking the plurality of memory blocks as nodes to form a tree structure so that the data is assigned with the target storage space according to the tree structure when the space assigning request is received, wherein the tree structure comprises a plurality of nodes of multi-stage, wherein a total storage size of a parent node is a sum of total storage size of children nodes.

2. The method of claim 1, wherein assigning the target storage space to the data according to the received space assigning request comprises:
    traversing an available storage size in the nodes of the tree structure; and
    assigning the target storage space to the data according to the received space assigning request when the available storage size of the nodes that is greater than or equal to the size of the data is found in the tree structure.

3. The method of claim 2, further comprising:
    assigning the target storage space to the data according to the received space assigning request when the available storage size of the nodes with a smallest difference with the size of the data is found in the tree structure.

4. The method of claim 2, wherein assigning the target storage space to the data according to the received space assigning request further comprises:
    creating a new node when the available storage size of nodes that is greater than or equal to the size of the data is not found in the tree structure, so that the available storage size of the new node holds the data.

5. The method of claim 4, wherein creating the new node so that the available storage size of the new node holds the data comprises:
    adjusting a node with the available storage size to be a children node of the new node; then creating a new children node of the new node so that an available storage size of the children node of the new node holds the data; or
    creating the new node so that the available storage size of the new node holds the data comprises:
    creating the new node so that the available storage size of the new node holds the data when an available storage size of all the nodes in the tree structure is 0; or
    creating the new node so that the available storage size of the new node holds the data comprises:
    creating the new node so that the available storage size of the new node holds the data when a current available storage size of the nodes that is greater than or equal to the size of the data is not found in the tree structure, and a size of data included in a next space assigning request is no larger than the current available storage size.

6. The method of claim 1, wherein the size of the data included in the space assigning request is represented by a first function.

7. The method of claim 6, further comprising:
    forming a plurality of memory blocks, wherein each memory block has a total storage size identifier and an available storage size identifier, wherein the total storage size identifier is configured to indicate a total storage size of the memory block by a first function, and the available storage size identifier is configured to indicate an available storage size of the memory block by a second function; and
    taking the plurality of memory blocks as nodes to form a tree structure so that the data is assigned with the target storage space according to the tree structure when the space assigning request is received, wherein the tree structure comprises a plurality of nodes of multi-stage, wherein a total storage size of a parent node is a sum of total storage size of children nodes.

8. The method of claim 7, wherein assigning the target storage space to the data according to the received space assigning request comprises:
    traversing an available storage size in the nodes of the tree structure; and
    assigning the storage space indicated by a common function as the target storage space when the available storage size of nodes represented by the second function is found in the tree structure, wherein the second function and the first function have the common function.

9. The method of claim 8, further comprising:
    assigning the storage space indicated by a maximum common function as the target storage space when the available storage size of nodes represented by the second function is found in the tree structure, wherein the second function and the first function have the maximum common function.

10. The method of claim 8, further comprising:
    traversing the available storage size of the nodes in the tree structure repeatedly until no available storage size is found.

11. The method of claim 8, wherein assigning the target storage space to the data according to the received space assigning request comprises:
    creating a new node so that an available storage size of the new node holds the data when the available storage size of the nodes that is greater than or equal to the size of the data is not found in the tree structure.

12. The method of claim 11, wherein creating the new node so that the available storage size holds the data comprises:
    adjusting a node with the available storage size to be a children node of the new node;
    creating a new children node of the new node so that an available storage size of the children node of the new node holds the data; or
    creating the new node so that the available storage size holds the data comprises:
    creating the new node so that the available storage size of the new node holds the data when an available storage size of all the nodes in the tree structure is 0; or
    creating the new node so that the available storage size of the new node holds the data comprises:
    creating the new node so that the available storage size of the new node holds the data when a current available storage size of the nodes that is greater than or equal to the size of the data is not found in the tree structure, and a size of data included in a next space assigning request is no larger than a size of the current available storage size.

13. The method of claim 11, wherein creating the new node so that the available storage size of the new node holds the data comprises:
creating a new node when the first function and the second function have non-common parts;
adjusting a node of the common function possessed by the first function and the second function to be a children node of the new node; and
creating a new children node of the new node so that an available storage size of the children node of the new node holds the data.

14. The method of claim 1, further comprising:
adjusting a position of the node so that space of the plurality of memory blocks is continuous.

15. The method of claim 1, further comprising:
fixing an order of the nodes in the tree structure.

16. The method of claim 1, further comprising:
releasing a corresponding node in response to a received space releasing request; and
updating an available storage size identifier of the released node.

17. The method of claim 1, wherein allocating the space address to the data based on the assigned target storage space comprises:
assigning addresses to other nodes at the same level after allocating a space address to one node, wherein an address of each node covers addresses of all children nodes of the node.

* * * * *